US006651027B2

(12) United States Patent
McCall et al.

(10) Patent No.: US 6,651,027 B2
(45) Date of Patent: Nov. 18, 2003

(54) PROCESSING METHOD FOR MOTION MEASUREMENT

(75) Inventors: Hiram McCall, Chatsworth, CA (US); Ching-Fang Lin, Chatsworth, CA (US)

(73) Assignee: American GNC Corporation, Simi Valley, CA (US)

(*) Notice: Subject to any disclaimer, the term of this patent is extended or adjusted under 35 U.S.C. 154(b) by 0 days.

(21) Appl. No.: 10/033,444

(22) Filed: Dec. 26, 2001

(65) Prior Publication Data

US 2002/0107658 A1 Aug. 8, 2002

Related U.S. Application Data

(62) Division of application No. 09/399,980, filed on Sep. 20, 1999.

(51) Int. Cl.[7] .............................. G06F 15/00

(52) U.S. Cl. ........................ 702/141; 701/11

(58) Field of Search ................ 702/141, 150, 702/151, 152, 93, 94, 95; 701/11, 220; 73/504.01, 504.02, 504.03, 504.04

(56) References Cited

U.S. PATENT DOCUMENTS

| 4,254,465 A | * | 3/1981 | Land ...................... 701/220 |
| 4,303,978 A | * | 12/1981 | Shaw et al. ............. 701/220 |
| 4,914,598 A | * | 4/1990 | Krogmann et al. ....... 701/11 |
| 5,331,578 A | * | 7/1994 | Stieler .................... 702/93 |

* cited by examiner

Primary Examiner—Marc S. Hoff
Assistant Examiner—Charioui Mohamed
(74) Attorney, Agent, or Firm—Raymond Y. Chan; David and Raymond Patent Group

(57) ABSTRACT

A processing method for motion measurement, which is adapted to apply to output signals proportional to rotation and translational motion of a carrier, respectively from rate sensors and acceleration sensors, is more suitable for emerging MEMS rate and acceleration sensors. Compared with a conventional IMU, the processing method utilizes a feedforward open-loop signal processing scheme to obtain highly accurate motion measurements by means of signal digitizing, temperature control and compensation, sensor error and misalignment calibrations, attitude updating, and damping control loops, and dramatically shrinks the size of mechanical and electronic hardware and power consumption, meanwhile, obtains highly accurate motion measurements.

74 Claims, 18 Drawing Sheets

PROCESSING METHOD FOR MOTION MEASUREMENT

CROSS REFERENCE OF RELATED APPLICATION

This is a divisional application of a non-provisional application having an application Ser. No. 09/339,980 and a filing date of Sep. 20, 1999.

BACKGROUND OF THE PRESENT INVENTION

1. Field of the Present Invention

The present invention relates to a processing method for motion measurement, and more particularly to a processing method for a motion inertial measurement unit, wherein output signals of an angular rate producer and acceleration producer, such as an angular rate device array and an acceleration device array, or an angular rate and acceleration simulator, are processed to obtain highly accurate attitude and heading measurements of a carrier under dynamic environments.

2. Description of Related Arts

Generally, conventional methods for determining the motion of a carrier are to employ inertial angular rate devices and acceleration devices, such as gyros and accelerometers, radio positioning systems, and hybrid systems.

In principle, inertial motion measurement methods depend on three orthogonally mounted inertial rate sensors and three orthogonally mounted accelerometers to obtain three-axis rate and acceleration measurement signals. The three orthogonally mounted inertial rate sensors and three orthogonally mounted accelerometers with additional supporting mechanical structure and electronics devices are conventionally called an Inertial Measurement Unit (IMU). The existing IMUs may be cataloged into Platform IMU and Strapdown IMU.

In the Platform IMU, rate sensor and accelerometers are installed on a stabilized platform. Attitude measurements can be directly picked off from the platform structure. But attitude rate measurements can not be directly obtained from the platform. Moreover, there are highly accurate feedback controlling loops associated with the platform.

Compared with the platform IMU, in the strapdown IMU, rate sensors and accelerometers are directly fixed in the carrier and move with the carrier. The output signals of strapdown rate sensors and accelerometers are expressed in the carrier body frame. The attitude and attitude rate measurements can be obtained by means of a series of computations.

Conventional inertial rate sensors include Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc.

Conventional accelerometer includes Pulsed Integrating Pendulous Accelerometer (PIPA), Pendulous Integrating Gyro Accelerometer (PIGA), etc.

The processing methods in conventional IMUs vary with types of gyros and accelerometers used in the IMUs. Because conventional gyros and accelerometers have big size, large power consumption, and moving mass, complex feedback controlling loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs.

New horizons are opening up for inertial sensor device technologies. MEMS (MicroElectronicMechanicalSystem) inertial sensors offer tremendous cost, size, reliability improvements for guidance, navigation, and control systems, compared with conventional inertial sensors. It is well-known that the silicon revolution began over three decades ago, with the introduction of the first integrated circuit. The integrated circuit has changed virtually every aspect of our lives. The hallmark of the integrated circuit industry over the past three decades has been the exponential increase in the number of transistors incorporated onto a single piece of silicon. This rapid advance in the number of transistors per chip leads to integrated circuits with continuously increasing capability and performance. As time has progressed, large, expensive, complex systems have been replaced by small, high performance, inexpensive integrated circuits. While the growth in the functionality of microelectronic circuits has been truly phenomenal, for the most part, this growth has been limited to the processing power of the chip.

MEMS, or, as stated more simply, micromachines, are considered the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, Dual Input Axis MEMS Angular Rate Sensors may be based on angular resonance of a rotating rigid rotor suspended by torsional springs. The inherent symmetry of the circular design allows angular rate measurement about two axes simultaneously. Preferred MEMS angular rate sensors are mostly based on an electronically-driven tuning fork method. Such MEMS gyros operate in accordance with the dynamic theory (Coriolis Effect) that when an angular rate is applied to a translating body, a Coriolis force is generated. When this angular rate is applied, the axis of an oscillating tuning fork, its tines receive a Coriolis force, which then produces torsional forces about the sensor axis. These forces are proportional to the applied angular rate, which then can be measured capacitively, as shown in FIG. 16.

MEMS devices can be fabricated by bulk micromachining (chemical etching) single crystal silicon or by surface micromachining layers of ploysilicon. Surface micromachined devices are typically a few microns to 10 microns thick while bulk machining produces devices 100 to 500 microns thick. Angular rate sensors created with surface machining have very low masses and are presently not sensitive enough for military applications but are useful for automotive applications. Bulk machining produces devices with far greater mass but it is a much more expensive technology. Allied Signal produces bulk machined inertial sensors. The advantage of surface machining is the low cost and the ease of incorporating the electronics close to the sensor.

FIG. 17 depicts the basis of the Charles Stark Draper Laboratory design based on an electronically-driven tuning fork method. The MEMS angular rate sensor measures angular rate voltage signals by picking-off a signal generated by an electromechanical oscillating mass as it deviates from its plane of oscillation under the Coriolis force effect when submitted to a rotation about an axis perpendicular to the plane of oscillation. Two vibrating proof masses are attached by springs to each other and to the surrounding stationary material. The vibrating (dither) proof masses are driven in opposite directions by electrostatic comb drive motors to maintain lateral in-plane oscillation. The dither motion is in the plane of the wafer. When an angular rate is applied to the MEMS device about the input axis (which is in the plane of the tines), the proof masses are caused to oscillate out of plane by a Coriolis force due to Coriolis effect. The resulting out-of-plane up and down oscillation motion amplitude, proportional to the input angular rate is detected and measured by capacitive pickoff plates underneath the proof masses. The device can either be designed for closed loop or open loop operation. Running the device closed loop adds more complexity but less cross coupling and better linearity. The comb drives move the masses out of phase with respect to each other. The masses will then respond in opposite directions to the Corilois force.

Several MEMS accelerometers incorporate piezoresistive bridges such as those used in early micromechnical pressure gauges. More accurate accelerometers are the force rebalance type that uses closed-loop capacitive sensing and electrostatic forcing. Draper's micromechnical accelerometer is a typical example, where the accelerometer is a monolithic silicon structure consisting of a torsional pendulum with capacitive readout and electrostatic torquer. Analog Device's MEMS accelerometer has interdigitated ploysilicon capacitive structure fabricated with on-chip BiMOS process to include a precision voltage reference, local oscillators, amplifiers, demodulators, force rebalance loop and self-test functions.

Analog Device's MEMS accelerometer is a combination of springs, masses, motion sensing and actuation cells. It consists of a variable differential air capacitor whose plates are etched into the suspended polysilicon layer. The moving plate of the capacitor is formed by a large number of "fingers" extending from the "beam", a proof mass supported by tethers anchored to the substrate. Tethers provide the mechanical spring constant that forces the proof mass to return to its original position when at rest or at constant velocity, as shown in FIG. 18, which shows a micromachined sensor unit. The fixed plates of the capacitor are formed by a number of matching pairs of fixed fingers positioned on either side of the moving fingers attached to the beam, and anchored to the substrate.

When responding to an applied acceleration or under gravity, the proof mass' inertia causes it to move along a predetermined axis, relative to the rest of the chip, as shown in FIG. 19. As the fingers extending from the beam move between the fixed fingers, capacitance change is being sensed and used to measure the amplitude of the force that led to the displacement of the beam.

To sense the change in capacitance between the fixed and moving plates, two 2 MHz square wave signals of equal amplitude, but 180° out of phase from each other, are applied to the fingers forming the fixed plates of the capacitor. At rest, the space between each one of the fixed plates and the moving plate is equidistant, and both signals are coupled to the movable plate where they subtract from each other resulting in a waveform of zero amplitude.

As soon as the chip experiences acceleration, the distance between one of the fixed plates and the movable plate increases while the distance between the other fixed plate and the movable plate decreases, resulting in capacitance imbalance. More of one of the two square wave signals gets coupled into the moving plate than the other, and the resulting signal at the output of the movable plate is a square wave signal whose amplitude is proportional to the magnitude of the acceleration, and whose phase is indicative of the direction of the acceleration.

The signal is then fed into a buffer amplifier and further into a phase-sensitive demodulator (synchronized on the same oscillator that generates the 1 MHz square wave excitation signals), which acts as a full wave-rectifier and low pass filter (with the use of an external capacitor). The output is a low frequency signal (dc to 1 kHz bandwidth), whose amplitude and polarity are proportional to acceleration and direction respectively. The synchronous demodulator drives a preamplifier whose output is made available to the user.

FIG. 20 shows the silhouette of the sensor structure used in Analog Device's MEMS accelerometer, ADXL 50. The microscopic sensor structure is surrounded by signal conditioning circuitry on the same chip. The sensor has numerous fingers along each side of the movable center member; they constitute the center plates of a parallel set of differential capacitors. Pairs of fixed fingers attached to the substrate interleave with the beam fingers to form the outer capacitor plates. The beam is supported by tethers, which serve as mechanical springs. The voltage on the moving plates is read via the electrically conductive tether anchors that support the beam.

SUMMARY OF THE PRESENT INVENTION

A main objective of the present invention is to provide a processing method of motion measurement which successfully incorporates the MEMS technology with the IMU industry.

Another objective of the present invention is to provide a processing method of motion measurement which is adapted to be applied to output signals of rate sensors and acceleration sensors, which are proportional to rotation and translational motion of the carrier, respectively, and more suitable for emerging MEMS (MicroElectronicMechanicalSystem) rate and acceleration sensors. Compared with a conventional IMU, the present invention utilizes a feedforward open-loop signal processing scheme to obtain highly accurate motion measurements by means of signal digitizing, temperature control and compensation, sensor error and misalignment calibrations, attitude updating, and damping controlling loops, and dramatically shrinks the size of mechanical and electronic hardware and power consumption, meanwhile, obtains highly accurate motion measurements.

Another objective of the present invention is to provide a processing method for outputting voltage signals of an angular rate producer and an acceleration producer, such as an angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments.

Although the present invention can be applicable to existing angular rate devices and acceleration devices, the present invention is specifically suitable for emerging MEMS angular rate devices and acceleration devices assembled into a core micro IMU, wherein the core micro IMU has the following unique features:

(1) Attitude Heading Reference System (AHRS) Capable Core Sensor Module.
(2) Miniaturized (Length/Width/Height) and Light Weight.
(3) High Performance and Low Cost.
(4) Low Power Dissipation.
(5) Dramatic Improvement In Reliability (microelectromechanical systems MEMS).

Another objective of the present invention is to provide a processing method for motion measurement which enables the core micro IMU rendering into an integrated micro land navigator that has the following unique features:

(1) Miniature, light weight, low power, low cost.
(2) AHRS, odometer, integrated GPS chipset and flux valve.
(3) Integration filter for sensor data fusion and zero velocity updating.
(4) Typical applications: automobiles, railway vehicles, miniature land vehicles, robots, unmanned ground vehicles, personal navigators, and military land vehicles.

Another objective of the present invention is to provide a processing method for motion measurement which enables the core micro IMU to function as aircraft inertial avionics, which has the following unique features:

(1) Rate Gyro
(2) Vertical Gyro
(3) Directional Gyro
(4) AHRS
(5) IMU
(6) Inertial Navigation System
(7) Fully-Coupled GPS/MEMS IMU Integrated System
(8) Fully-Coupled GPS/IMU/Radar Altimeter Integrated System
(9) Universal vehicle navigation and control box.

Another objective of the present invention is to provide a processing method for motion measurement which enables the core micro IMU to function as a Spaceborne MEMS IMU Attitude Determination System and a Spaceborne Fully-Coupled GPS/MEMS IMU Integrated system for orbit determination, attitude control, payload pointing, and formation flight, that have the following unique features:

(1) Shock resistant and vibration tolerant
(2) High anti-jamming
(3) High dynamic performance
(4) Broad operating range of temperatures
(5) High resolution
(6) Compact, low power and light weight unit
(7) Flexible hardware and software architecture Another objective of the present invention is to provide a processing method for motion measurement which enables the core micro IMU to form a marine INS with embedded GPS, which has the following unique features:

(1) Micro MEMS IMU AHRS with Embedded GPS
(2) Built-in CDU (Control Display Unit)
(3) Optional DGPS (Differential GPS)
(4) Flexible Hardware and Software System Architecture
(5) Low Cost, Light Weight, High Reliability Another objective of the present invention is to provide a processing method for motion measurement which enables the core micro IMU to be used in a micro pointing and stabilization mechanism that has the following unique features:

(1) Micro MEMS IMU AHRS utilized for platform stabilization.
(2) MEMS IMU integrated with the electrical and mechanical design of the pointing and stabilization mechanism.
(3) Vehicle motion, vibration, and other interference rejected by a stabilized platform.
(4) Variable pointing angle for tracker implementations.
(5) Typical applications: miniature antenna pointing and tracking control, laser beam pointing for optical communications, telescopic pointing for imaging, airborne laser pointing control for targeting, vehicle control and guidance.

DETAIL DESCRIPTION OF THE PREFERRED EMBODIMENT

MEMS exploits the existing microelectronics infrastructure to create complex machines with micron feature sizes. These machines can have many functions, including sensing, communication, and actuation. Extensive applications for these devices exist in a wide variety of commercial systems.

It is quite a straightforward idea that we can exploit the MEMS sensors' merits of small size, low cost, batch processing, and shock resistance to develop a low cost, light weight, miniaturized, highly accurate integrated MEMS motion measurement system.

It is well known that existing processing methods for motion inertial measurement unit are most suitable for conventional angular rate sensors or gyros and accelerometers, and can not produce optimal performance for MEMS angular rate devices and acceleration devices.

The present invention provides a processing method for a motion inertial measurement unit, wherein output signals of angular rate producer and acceleration producer, such as angular rate device array and acceleration device array, or an angular rate and acceleration simulator, are processed to obtain highly accurate attitude and heading measurements of a carrier under dynamic environments.

The angular rate producer, such as MEMS angular rate device array or gyro array, provides three-axis angular rate measurement signals of a carrier. The acceleration producer, such as MEMS acceleration device array or accelerometer array, provides three-axis acceleration measurement signals of the carrier. The motion measurements of the carrier, such as attitude and heading angles, achieved by means of processing procedure of the three-axis angular rate measurement signals from the angular rate producer and three-axis acceleration measurement signals from the acceleration producer.

In the present invention, output signals of angular rate producer and acceleration producer are processed to obtain digital highly accurate angular rate increment and velocity increment measurements of the carrier and are further processed to obtain highly accurate attitude and heading measurements of the carrier under dynamic environments. The present invention is specifically suitable for emerging MEMS angular rate devices and acceleration devices, which are assembled into an inertial measurement unit (IMU), such as core micro IMU.

Figure 1:
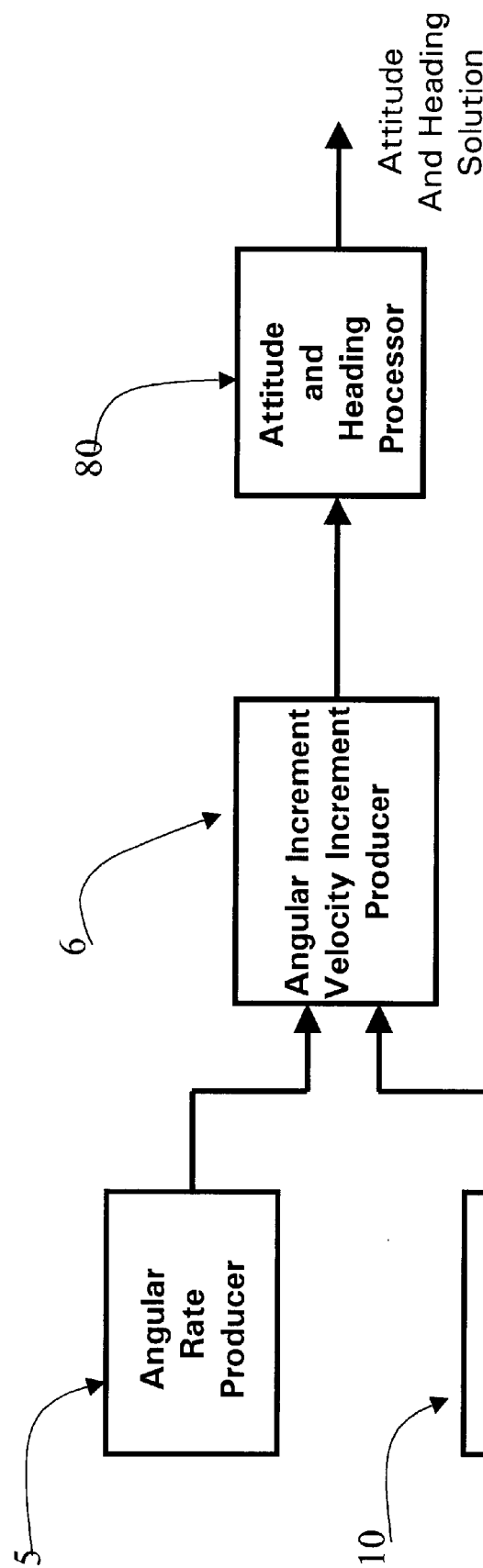
FIG. 1 is a block diagram illustrating the processing module for carrier motion measurements according to a preferred embodiment of the present invention.

Referring to FIG. 1, the processing method for carrier motion measurement of the present invention comprises the following steps.

1. Produce three-axis angular rate signals by an angular rate producer 5 and three-axis acceleration signals by an acceleration producer 10.
2. Convert the three-axis angular rate signals into digital angular increments and convert the input three-axis acceleration signals into digital velocity increments in an angular increment and velocity increment producer 6.
3. Compute attitude and heading angle measurements using the three-axis digital angular increments and three-axis velocity increments in an attitude and heading processor 80.

In general, the angular rate producer 5 and the acceleration producer 10 are very sensitive to a variety of temperature environments. In order to improve measurement accuracy, referring to FIG. 2, the present invention further comprises an additional thermal controlling loop step 4, processed in parallel with the above steps 1 to 3, of maintaining a predetermined operating temperature throughout the above steps, wherein the predetermined operating temperature is a constant designated temperature selected between 150° F. and 185° F., preferable 176° F. (±1° F.).

Figure 2:
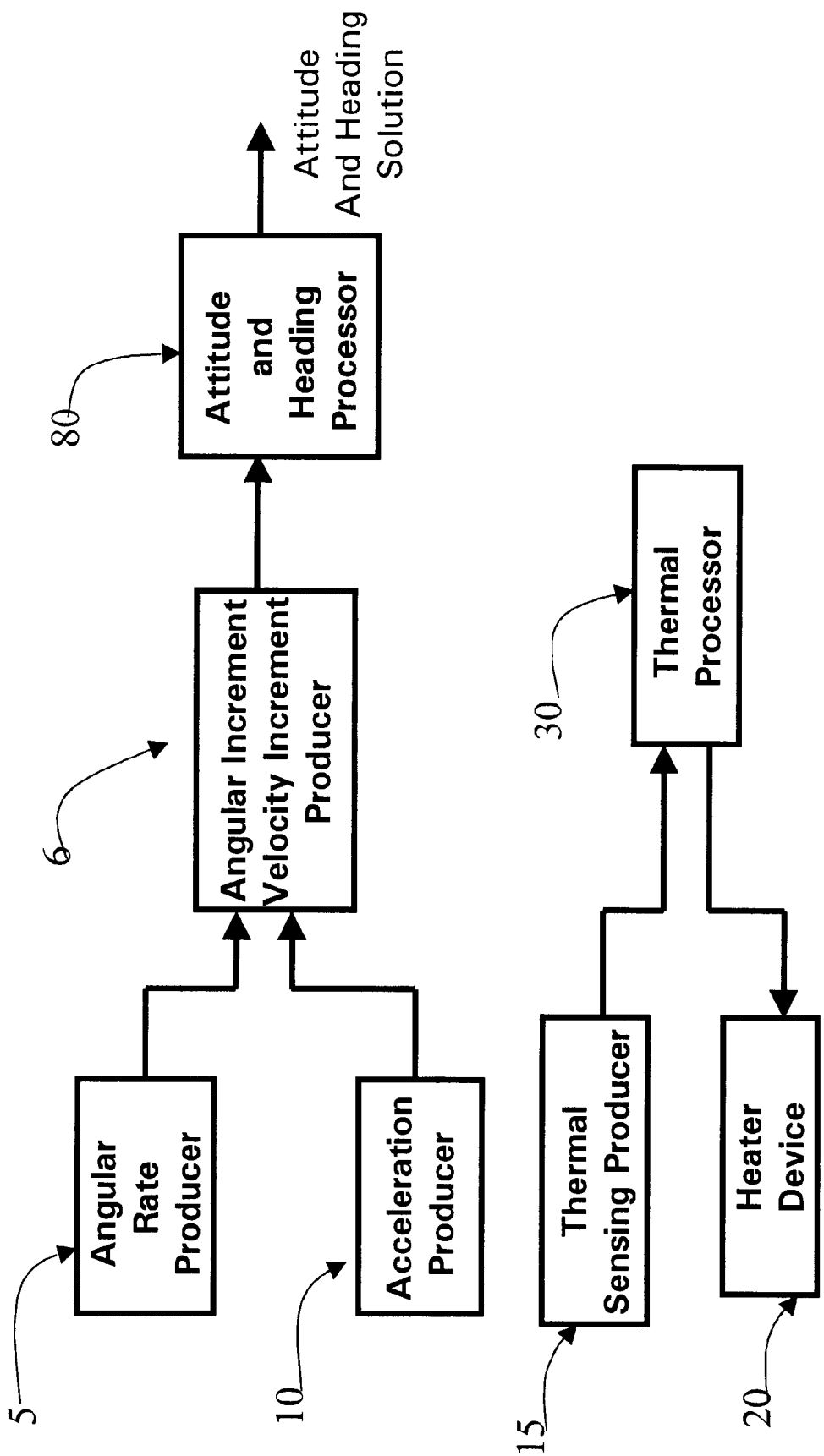
FIG. 2 is a block diagram illustrating the processing modules with thermal control processing for carrier motion measurements according to the above preferred embodiment of the present invention.

The above thermal controlling loop step 4, as shown in FIG. 2, further comprises the steps of:

4A-1. producing temperature signals by a thermal sensing producer 15;

4A-2. inputting the temperature signals to a thermal processor 30 for computing temperature control commands using the temperature signals, a temperature scale factor, and a predetermined operating temperature of the angular rate producer 5 and the acceleration producer 10;

4A-3. producing driving signals to a heater device 20 using the temperature control commands; and 4A-4. outputting the driving signals to the heater device 20 for controlling the heater device 20 to provide adequate heat for maintaining the predetermined operating temperature throughout the above steps 1 to 3.

Temperature characteristic parameters of the angular rate producer 5 and the acceleration producer 10 can be determined during a series of the angular rate producer and acceleration producer temperature characteristic calibrations.

Figure 3:
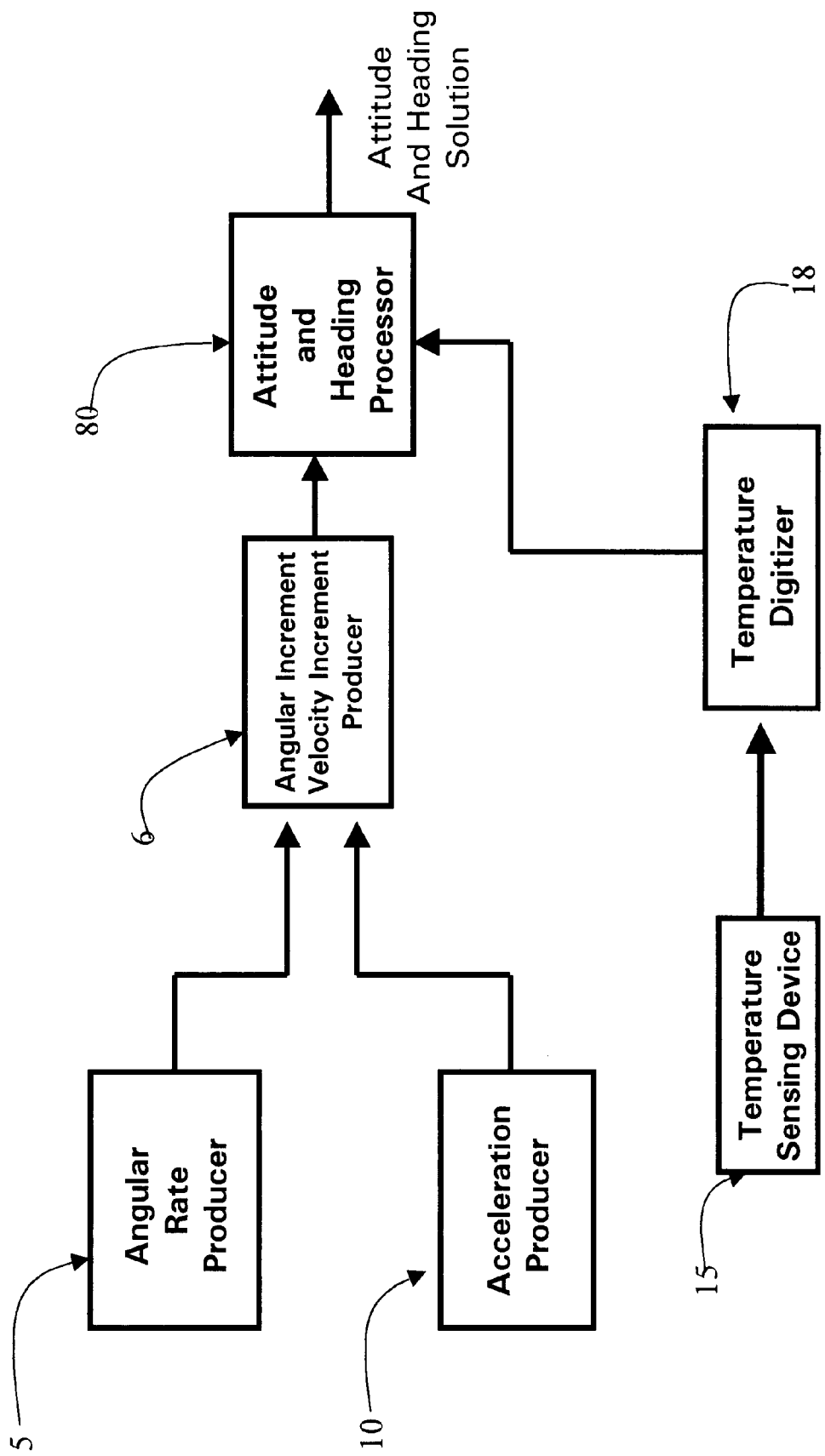
FIG. 3 is a block diagram illustrating the processing modules with thermal compensation processing for carrier motion measurements according to the above preferred embodiment of the present invention.

Referring to FIG. 3, when the above temperature controlling loop step 4 is not provided, in order to compensate the angular rate producer and acceleration producer measurement errors induced by a variety of temperature environments, after the above step 3, the present invention further comprises the steps of:

3A-1 producing temperature signals by a thermal sensing producer 15 and outputting a digital temperature value to an attitude and heading processor 80 by means of a temperature digitizer 18;

3A-2 accessing temperature characteristic parameters of the angular rate producer and the acceleration producer using a current temperature of the angular rate producer and the acceleration producer from the temperature digitizer 18; and 3A-3 compensating the errors induced by thermal effects in the input digital angular and velocity increments and computing attitude and heading angle measurements using the three-axis digital angular increments and three-axis velocity increments in the attitude and heading processor 80.

In preferable applications, in the above step 1, the angular rate producer 5 and the acceleration producer 10 are preferable MEMS angular rate device array and acceleration device array and the outputting signals of the angular rate producer 5 and the acceleration producer 10 are analog voltage signals. Current MEMS rate and acceleration sensors employ an input reference voltage to generate an output voltage which are proportional to input voltage and rotational and translational motion of a carrier, respectively. Therefore, step 1 further comprises the step of:

1.1 acquiring three-axis analog angular rate voltage signals from the angular producer 5, which are directly proportional to carrier angular rates, and 1.2 acquiring three-axis analog acceleration voltage signals from the acceleration producer 10, which are directly proportional to carrier accelerations.

Figure 5:
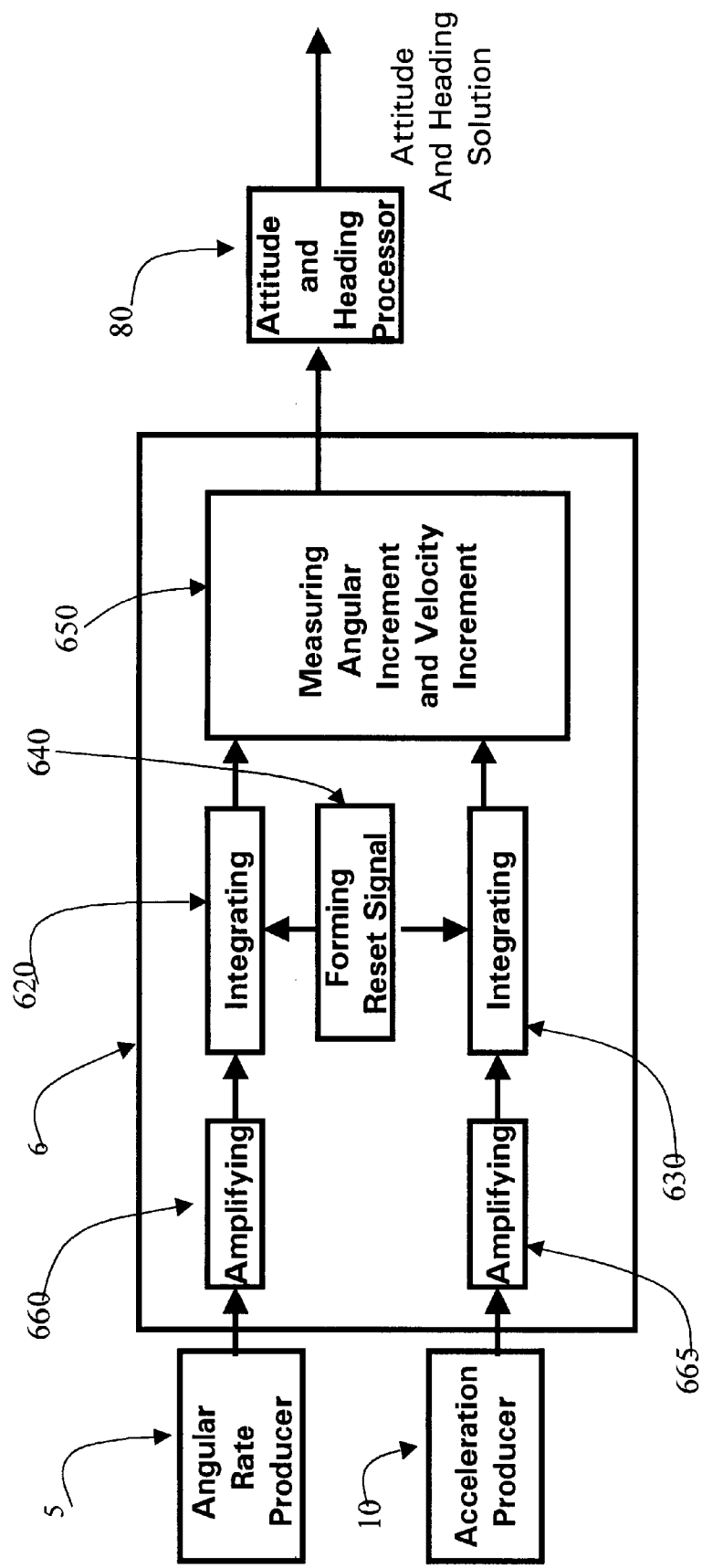
FIG. 5 is a block diagram illustrating another angular increment and velocity increment producer for outputting voltage signals of angular rate producer and acceleration producer for carrier motion measurements according to the above preferred embodiment of the present invention.
Figure 11:
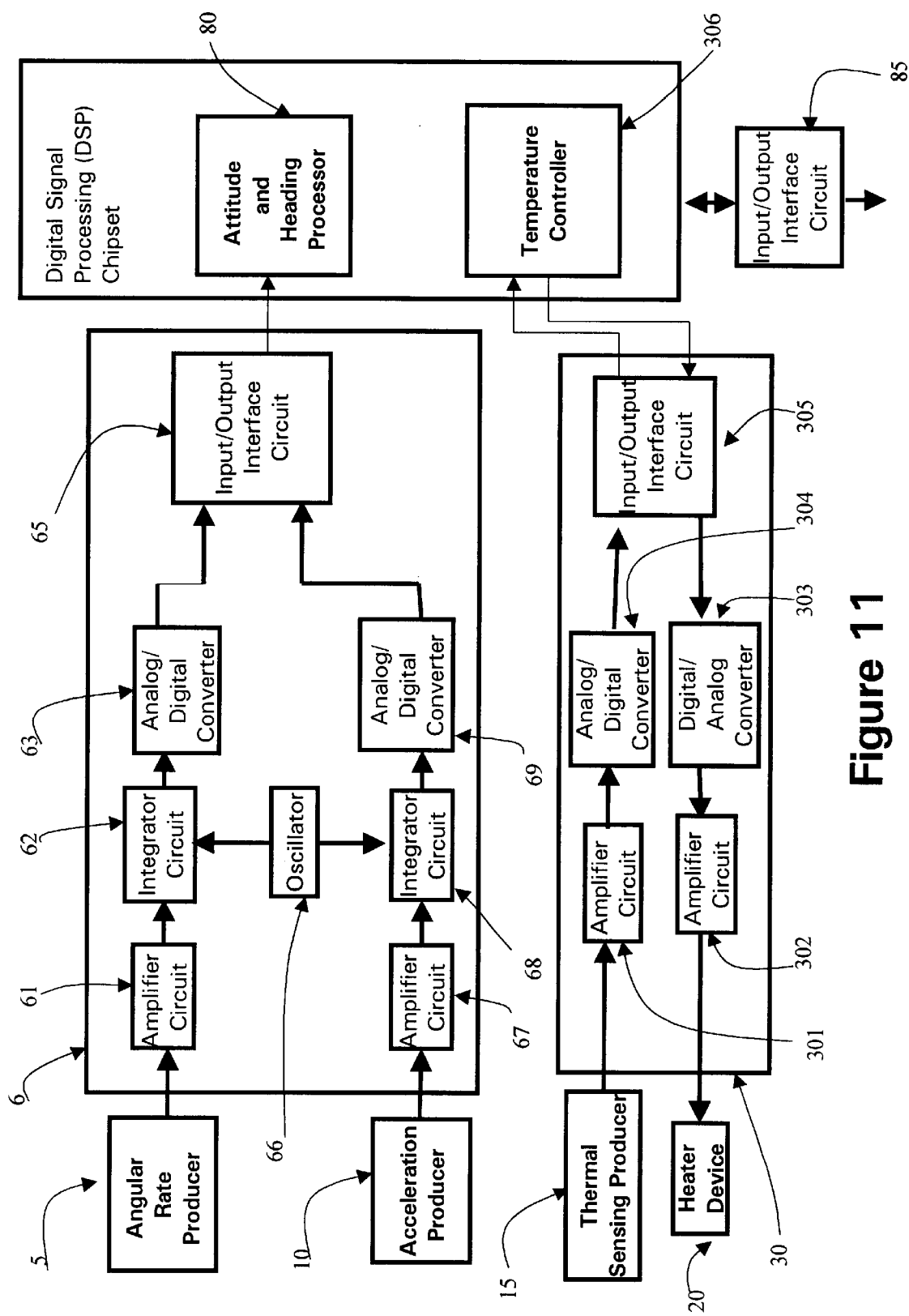
FIG. 11 is a block diagram illustrating a processing module for carrier motion measurements according to the above preferred embodiment of the present invention.

When the outputting analog voltage signals of angular rate producer 5 and the acceleration producer 10 are too weak for the above mentioned integrating step 2 to read, the above producing step 1 prefers to further comprise amplifying steps 1.3 and 1.4 as follows after the step 1.2 for amplifying the analog voltage signals input from the angular rate producer 5 and the acceleration producer 10 and suppressing noise signals residing within the analog voltage signals input from the angular rate producer 5 and the acceleration producer 10, as shown in FIGS. 5 and 11.

1.3 Amplify the three-axis analog angular rate voltage signals and the three-axis analog acceleration voltage signals by means of a first amplifier circuit 61 and a second amplifier circuit 67 respectively to form amplified three-axis analog angular rate signals and amplified three-axis analog acceleration signals respectively.

1.4 Output the amplified three-axis analog angular rate signals and the amplified three-axis analog acceleration signals to a first integrator circuit 62 and a second integrator circuit 68 respectively.

Figure 4:
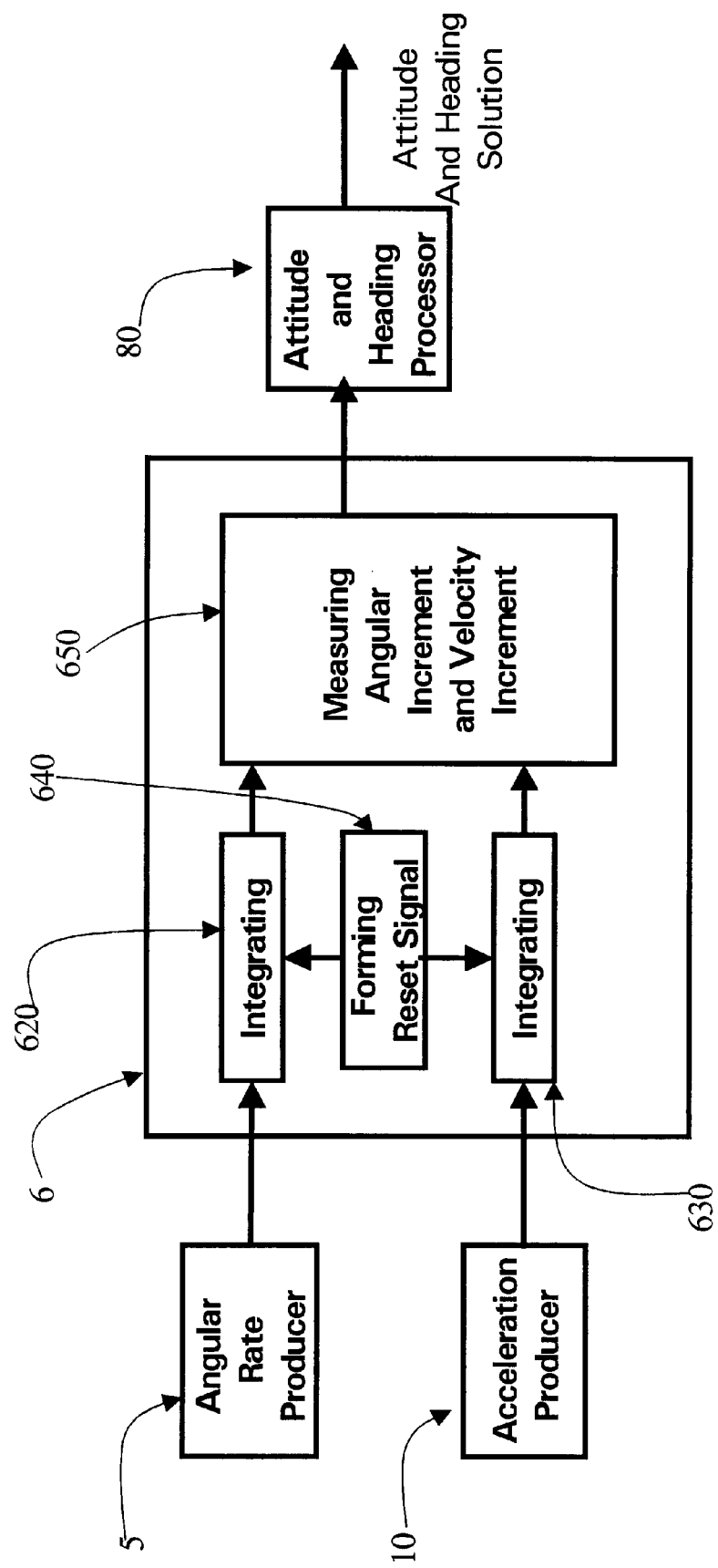
FIG. 4 is a block diagram illustrating an angular increment and velocity increment producer for outputting voltage signals of angular rate producer and acceleration producer for carrier motion measurements according to the above preferred embodiment of the present invention.

Accordingly, referring to FIG. 4, the above converting step 2 further comprises the following steps:

2.1. Integrate the three-axis analog angular rate voltage signals and the three-axis analog acceleration voltage signals for a predetermined time interval to accumulate the three-axis analog angular rate voltage signals and the three-axis analog acceleration voltage signals as a raw three-axis angular increment and a raw three-axis velocity increment for the predetermined time interval to achieve accumulated angular increments and accumulated velocity increments. The integration is performed to remove noise signals that are non-directly proportional to the carrier angular rate and acceleration within the three-axis analog angular rate voltage signals and the three-axis analog acceleration voltage signals, to improve signal-to-noise ratio, and to remove the high frequency signals in the three-axis analog angular rate voltage signals and the three-axis analog acceleration voltage signals. The signals that are directly proportional to the carrier angular rate and acceleration within the three-axis analog angular rate voltage signals and the three-axis analog acceleration voltage signals can be used in subsequent processing steps.

2.2 Form an angular reset voltage pulse and a velocity reset voltage pulse as an angular scale and a velocity scale respectively.

2.3 Measure the voltage values of the three-axis accumulated angular increments and the three-axis accumulated velocity increments with the angular reset voltage pulse and the velocity reset voltage pulse respectively to acquire angular increment counts and velocity increment counts as a digital form of angular and velocity measurements respectively.

In order to output real three-angular increment and velocity increment values as an optional output format to substitute the voltage values of the three-axis accumulated angular increments and velocity increments, after the above step 2.3 the converting step 2 further comprises an additional step of:

2.4 scaling the voltage values of the three-axis accumulated angular and velocity increments into real three-axis angular and velocity increment voltage values.

In the integrating step 2.1, the three-axis analog angular voltage signals and the three-axis analog acceleration voltage signals are each reset to accumulate from a zero value at an initial point of every predetermined time interval.

Figure 6:
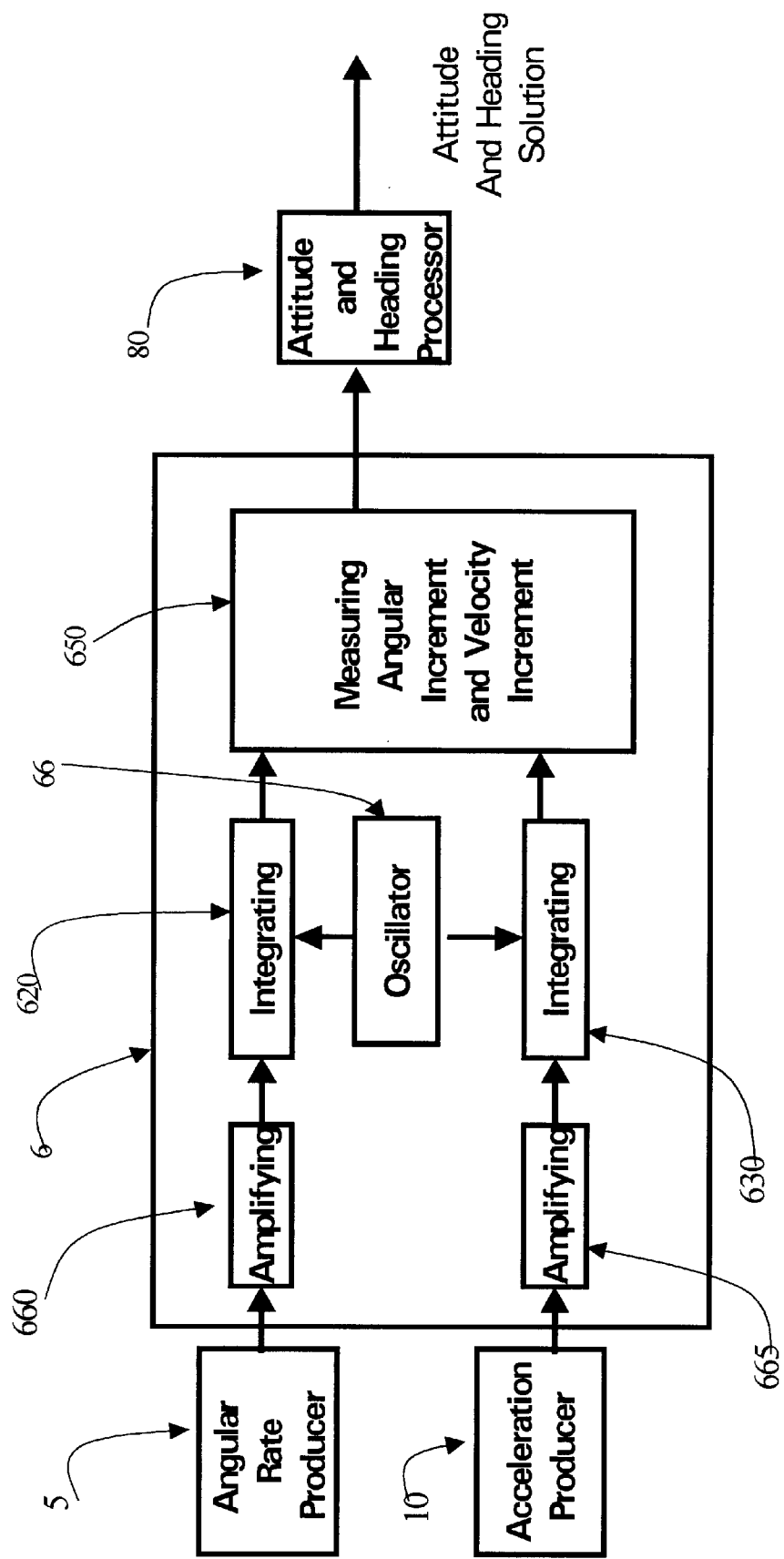
FIG. 6 is a block diagram illustrating another angular increment and velocity increment producer for outputting voltage signals of angular rate producer and acceleration producer for carrier motion measurements according to the above preferred embodiment of the present invention.

Moreover, in general, the angular reset voltage pulse and the velocity reset voltage pulse in the step 2.2 may be implemented by producing a timing pulse by an oscillator 66, as shown in FIG. 6.

Figure 7:
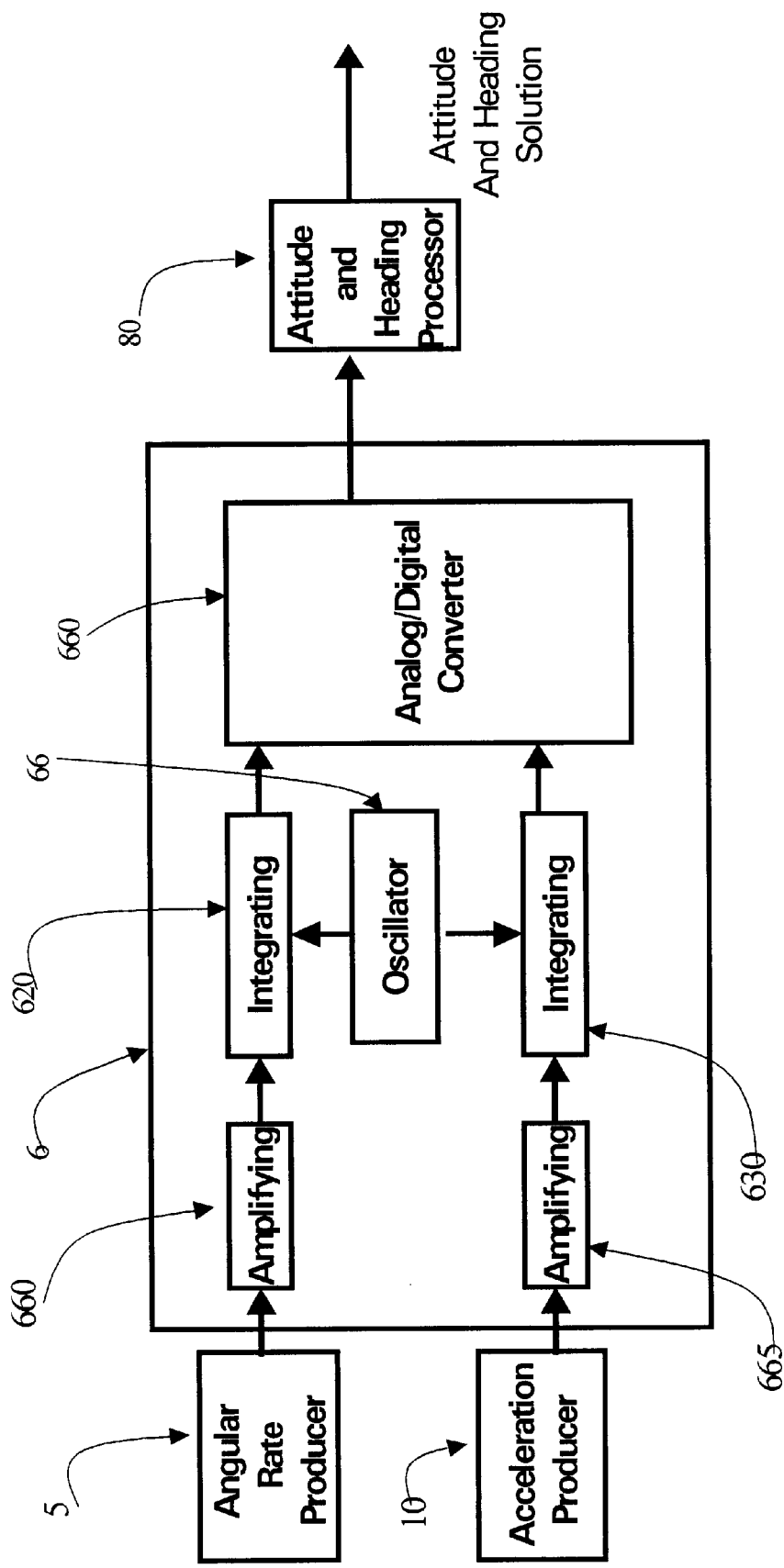
FIG. 7 is a block diagram illustrating another angular increment and velocity increment producer for outputting voltage signals of angular rate producer and acceleration producer for carrier motion measurements according to the above preferred embodiment of the present invention.

In the step 2.3, the measurement of the voltage values of the three-axis accumulated angular and velocity increments can be implemented by an analog/digital converter 650, as shown in FIG. 7. In other words, step 2.3 is substantially a digitization step for digitizing the raw three-axis angular and velocity increment voltage values into digital three-axis angular and velocity increments.

In applications, the above amplifying, integrating, analog/digital converter 650 and oscillator 66 can be built with circuits, such as Application Specific Integrated Circuits (ASIC) chip and a printed circuit board.

As shown in FIG. 11, the step 2.3 further comprises the steps of:

2.3.1 inputting the accumulated angular increments and the accumulated velocity increments into an angular analog/digital converter 63 and a velocity analog/digital converter 69 respectively;

2.3.2 digitizing the accumulated angular increments by the angular analog/digital converter 63 by measuring the accumulated angular increments with the angular reset voltage pulse to form a digital angular measurements of voltage in terms of the angular increment counts which is output to an input/output interface circuit 65;

2.3.3 digitizing the accumulated velocity increments by the velocity analog/digital converter 69 by measuring the accumulated velocity increments with the velocity reset voltage pulse to form a digital velocity measurements of voltage in terms of the velocity increment counts which is output to an input/output interface circuit 65; and 2.3.4 outputting the digital three-axis angular and velocity increment voltage values by the input/output interface circuit 65.

Figure 8:
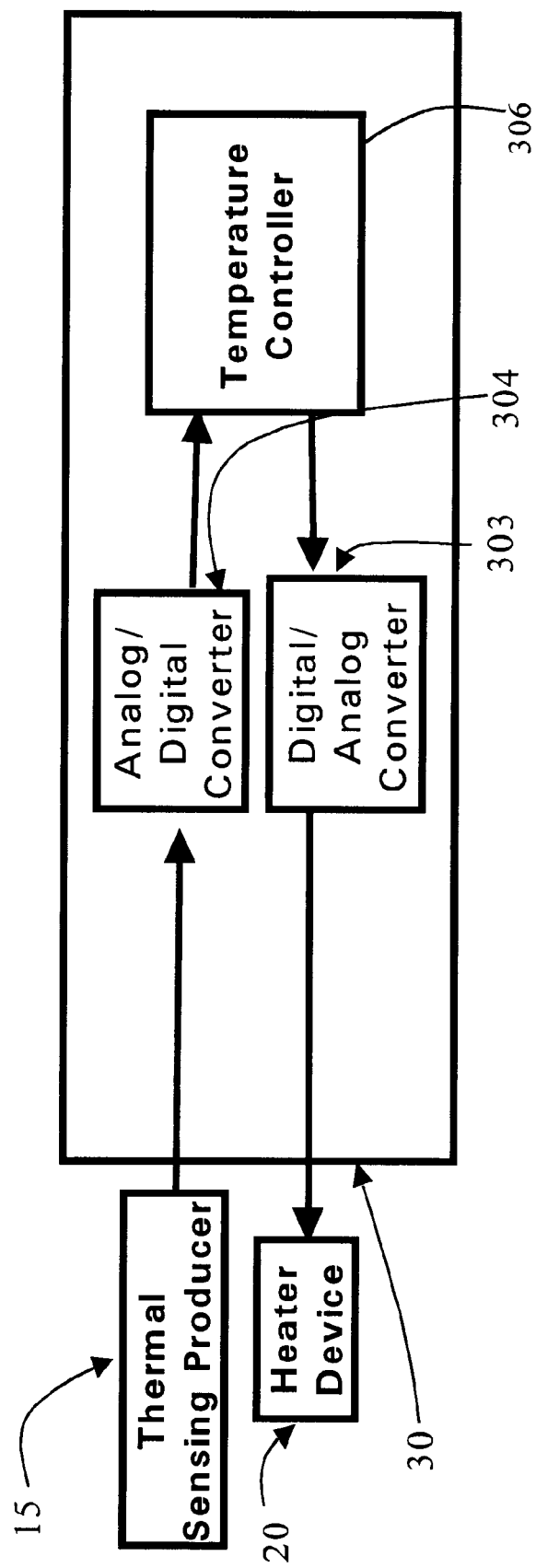
FIG. 8 is a block diagram illustrating a thermal processor for outputting analog voltage signals of the thermal sensing producer according to the above preferred embodiment of the present invention.

In order to achieve flexible adjustment of the thermal processor 30 for a thermal sensing producer 15 with analog voltage output and a heater device 20 with analog input, thermal processor 30 can be implemented in a digital feedback controlling loop as shown in FIG. 8. Referring to FIG. 8, the above thermal controlling loop step 4 alternatively comprises the steps of:

4B-1 producing temperature voltage signals by a thermal sensing producer 15 to an analog/digital converter 304, 4B-2 sampling the temperature voltage signals in the analog/digital converter 304 and digitizing the sampled temperature voltage signals to digital signals which are output to the temperature controller 306, 4B-3 computing digital temperature commands in a temperature controller 306 using the input digital signals from the analog/digital converter 304, a temperature sensor scale factor, and a pre-determined operating temperature of the angular rate producer and acceleration producer, wherein the digital temperature commands are fed back to a digital/analog converter 303, and 4B-4 converting the digital temperature commands input from the temperature controller 306 in the digital/analog converter 303 into analog signals which are output to a heater device 20 to provide adequate heat for maintaining the predetermined operating temperature throughout the above steps 1 to 3.

Figure 9:
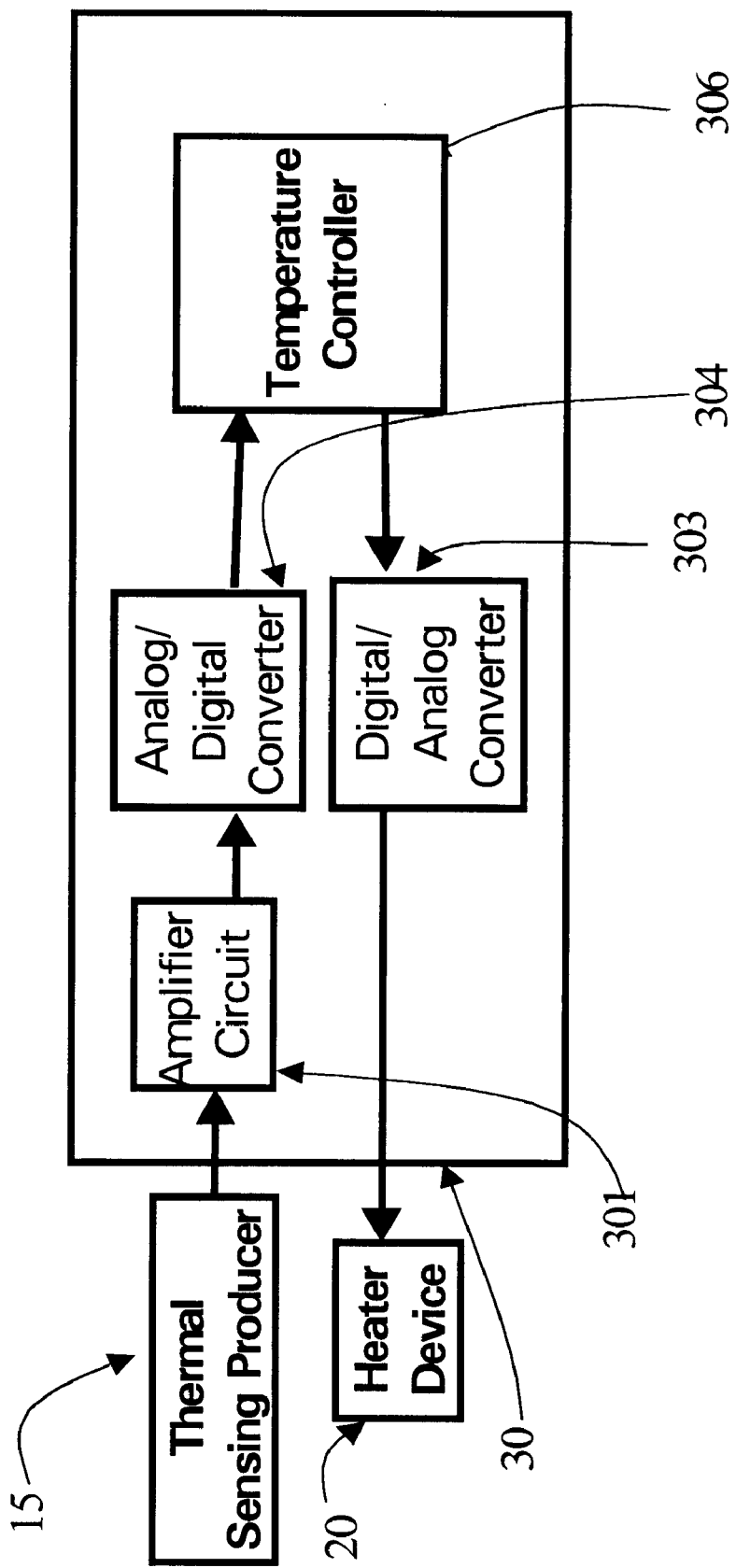
FIG. 9 is a block diagram illustrating another thermal processor for outputting analog voltage signals of the thermal sensing producer according to the above preferred embodiment of the present invention.

If the voltage signals produced by the thermal sensing producer 15 are too weak for the analog/digital converter 304 to read, referring to FIG. 9 there is an additional amplifying step 4-0 processed between the thermal sensing producer 15 and the digital/analog converter 303.

The amplifying step 4-0: Acquire voltage signals from the thermal sensing producer 15 to a first amplifier circuit 301 for amplifying the signals and suppressing the noise residing in the voltage signals and improving the signal-to-noise ratio, wherein the amplified voltage signals are output to the analog/digital converter 304.

Generally, the heater device 20 requires a specific driving current signals. In this case, referring to FIG. 10, there is an amplifying step 4.5 preferred to be processed between the digital/analog converter 303 and heater device 20:

Step 4B-5: amplifying the input analog signals from the digital/analog converter 303 for driving the heater device 20 in a second amplifier circuit 302; and closing the temperature controlling loop.

Figure 10:
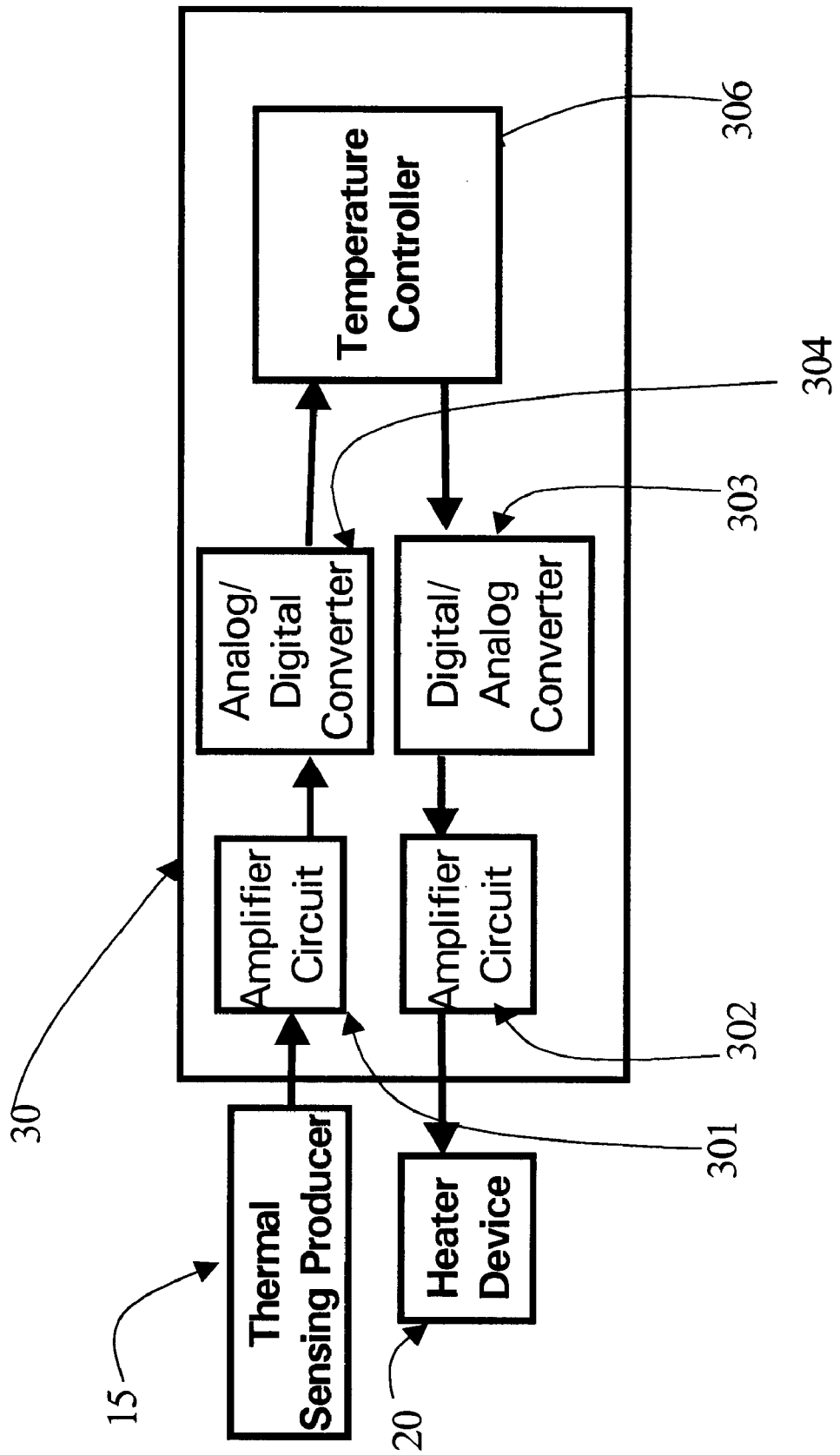
FIG. 10 is a block diagram illustrating another thermal processor for outputting analog voltage signals of the thermal sensing producer according to the above preferred embodiment of the present invention.

Sequentially, as shown in FIG. 10, the step 4B-4 further comprises the step of:

4B-4A converting the digital temperature commands input from the temperature controller 306 in the digital/analog converter 303 into analog signals which are output to the amplifier circuit 302.

Sometimes, an input/output interface circuit 305 is required to connect the analog/digital converter 304 and digital/analog converter 303 and with the temperature controller 306. In this case, referring to FIG. 11, the step 4B-2 comprises the step of:

4B-2A sampling the voltage signals in the analog/digital converter 304 and digitizing the sampled voltage signals, and the digital signals are output to the input/output interface circuit 305.

Sequentially, as shown in FIG. 11, the step 4B-3 comprises the step of:

4B-3A computing digital temperature commands in the temperature controller 306 using the input digital temperature voltage signals from the input/output interface circuit 305, the temperature sensor scale factor, and the pre-determined operating temperature of the angular rate producer and acceleration producer, wherein the digital temperature commands are fed back to the input/output interface circuit 305.

Moreover, as shown in FIG. 11, the step 4B-4 further comprises the step of:

4B-4B converting the digital temperature commands input from the input/output interface circuit 305 in the digital/analog converter 303 into analog signals which are output to the heater device 20 to provide adequate heat for maintaining the predetermined operating temperature throughout the above steps 1 to 3.

Figure 12:
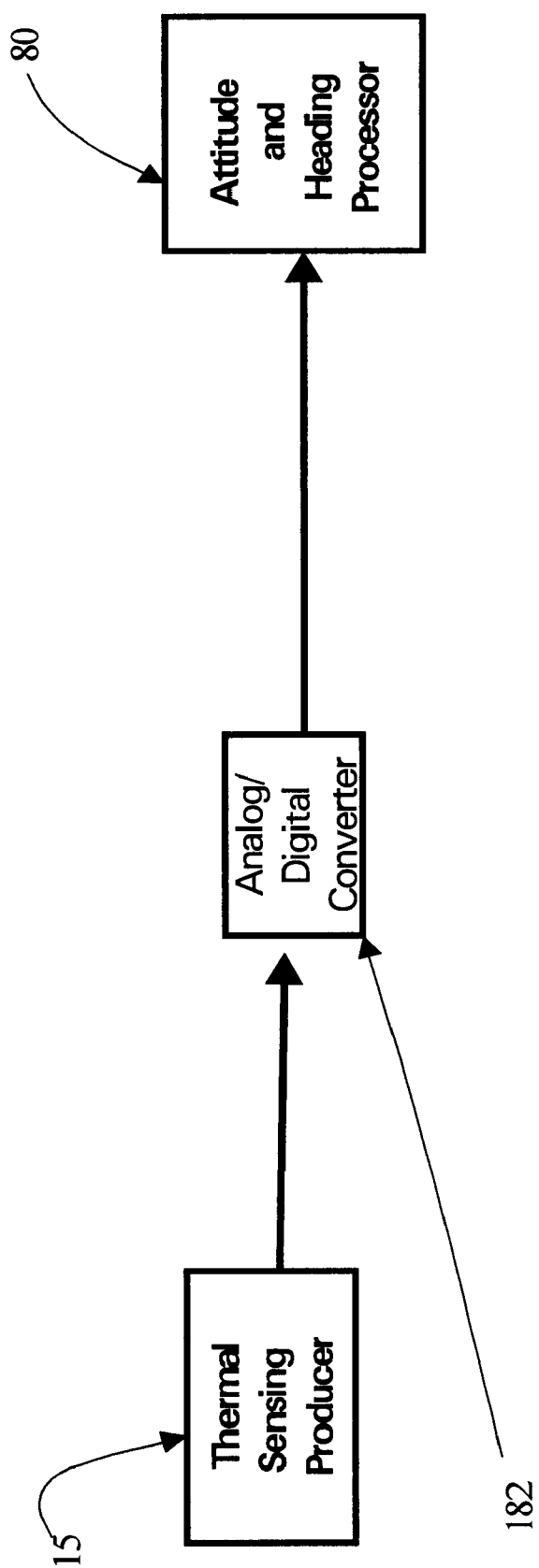
FIG. 12 is a block diagram illustrating a temperature digitizer for outputting analog voltage signals of the thermal sensing producer according to the above preferred embodiment of the present invention.
Figure 13:
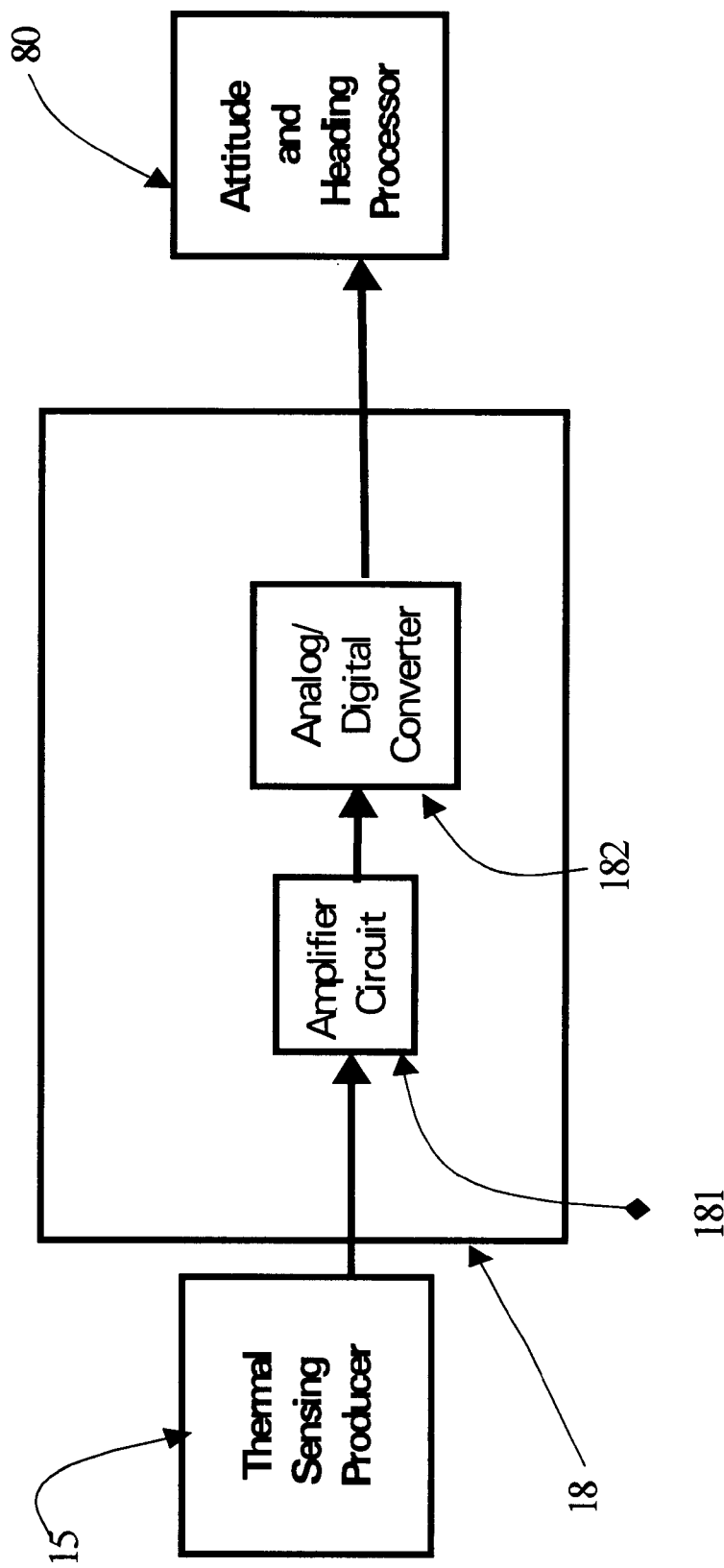
FIG. 13 is a block diagram illustrating a temperature digitizer for outputting analog voltage signals of the thermal sensing producer according to the above preferred embodiment of the present invention.

Referring to FIG. 12, the above mentioned step 3A-1 can be implemented by an analog/digital converter 182 for the thermal sensing producer 15 with analog voltage output. If the voltage signals produced by the thermal sensing producer 15 are too weak for the analog/digital converter 182 to read, referring to FIG. 13, there is an additional amplifying step processed between the thermal sensing producer 15 and the digital/analog converter 182. The step 3A-1 further comprises the steps of:

3A-1.1 acquiring voltage signals from the thermal sensing producer 15 to the amplifier circuit 181 for amplifying the signals and suppressing the noise residing in the voltage signals and improving the voltage signal-to-noise ratio, wherein the amplified voltage signals are output to the analog/digital converter 182, and 3A-1.2 sampling the input amplified voltage signals in the analog/digital converters 182 and digitizing the sampled voltage signals to form digital signals outputting to the attitude and heading processor 80.

Sometimes, an input/output interface circuit 183 is required to connect the analog/digital converter 182 with the attitude and heading processor 80. In this case, referring to FIG. 14, the step 3A-1.2 comprises the step of:

3A-1.2A sampling the input amplified voltage signals in the analog/digital converters 182 and digitizing the sampled voltage signals to form digital signals outputting to the input/output interface circuit 183.

Referring to FIG. 1, the digital three-axis angular increment voltage values or real values and three-axis digital velocity increment voltage values or real values are produced and outputted by the step 2.

Figure 15:
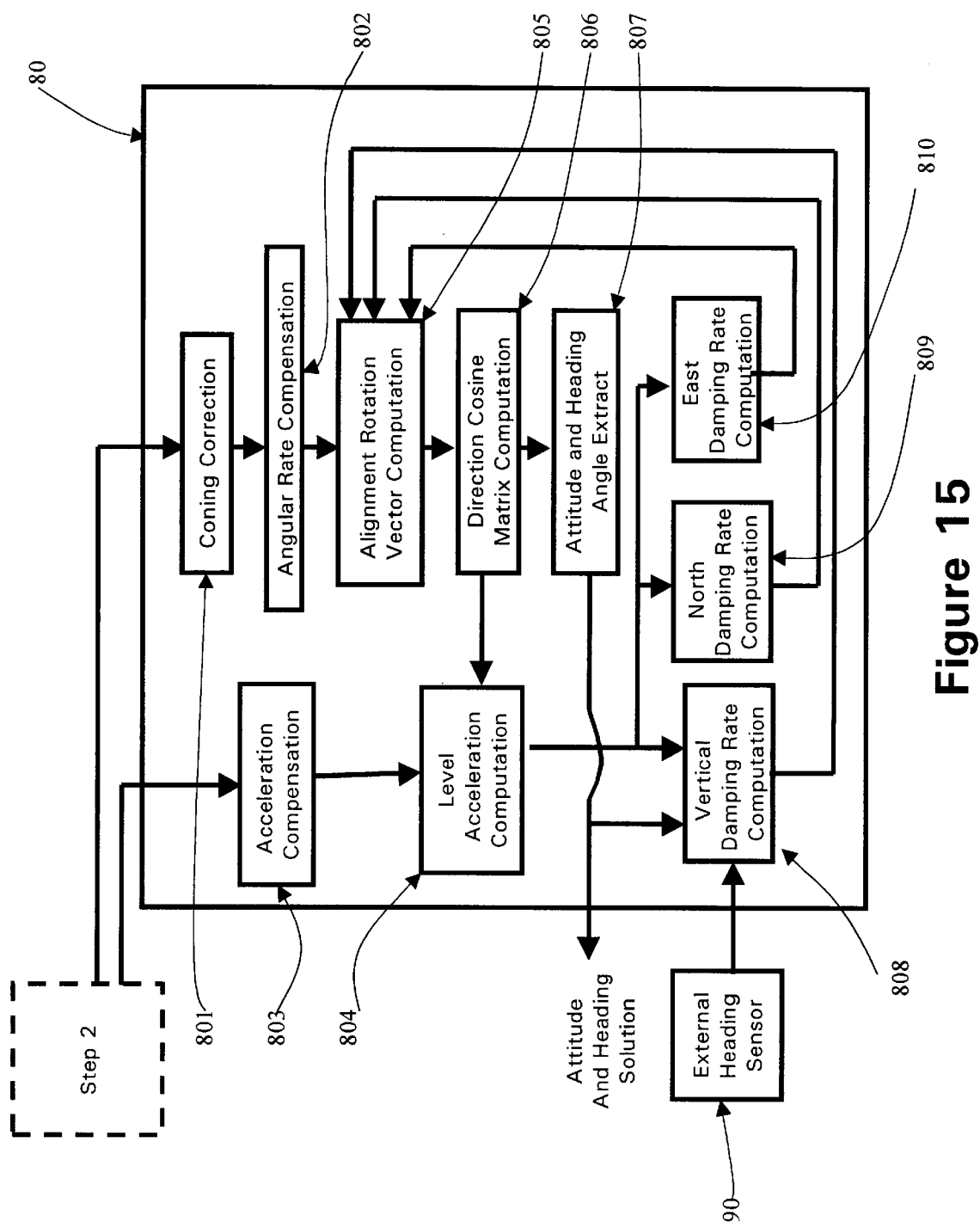
FIG. 15 is a block diagram illustrating the attitude and heading processing module according to the above preferred embodiment of the present invention.
Figure 16:
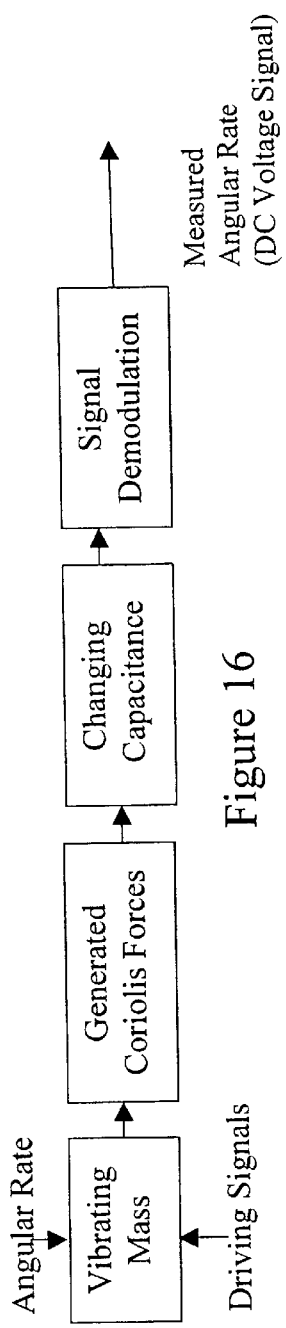
FIG. 16 is a block diagram illustrating the MEMS tuning fork angular rate sensor principle.
Figure 17:
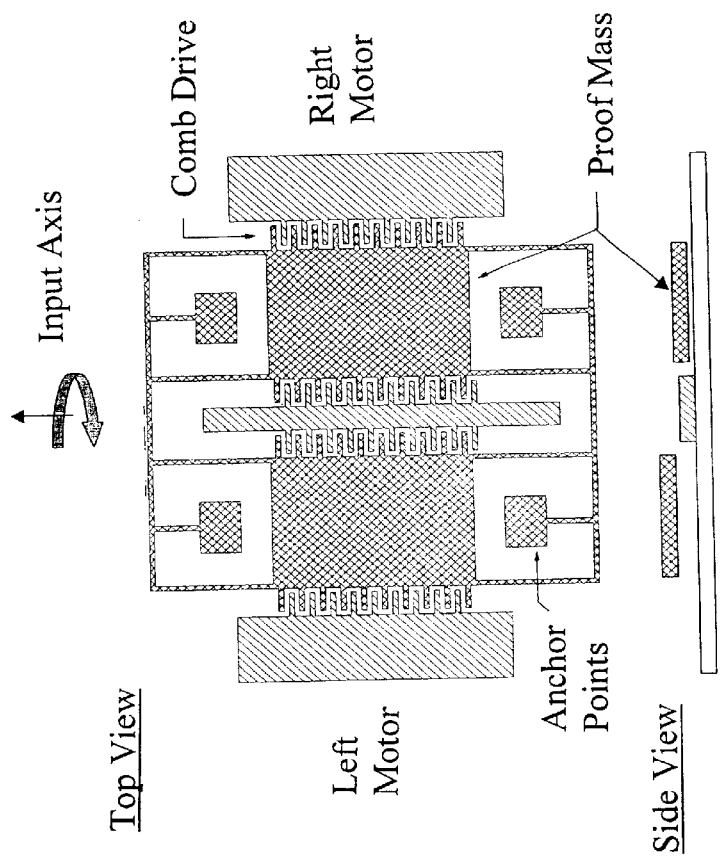
FIG. 17 is a schematic view of a MEMS tuning fork angular rate sensor structure.
Figure 18:
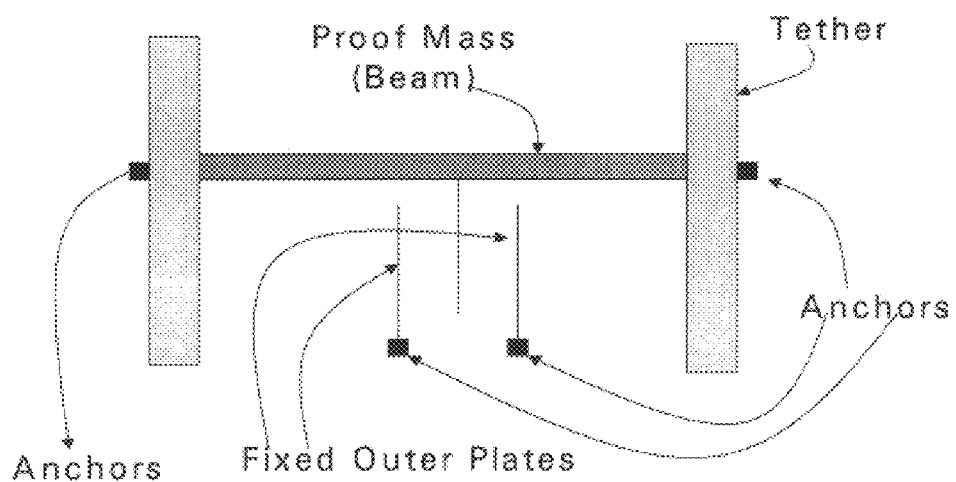
FIG. 18 is a schematic view of a micromachined sensor unit.
Figure 19:
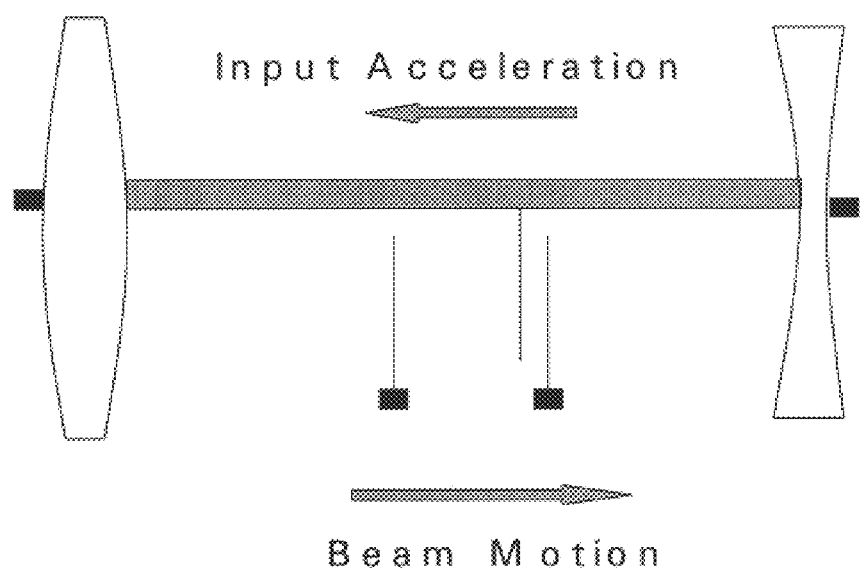
FIG. 19 is a schematic view of a sensor under an input acceleration.
Figure 20:
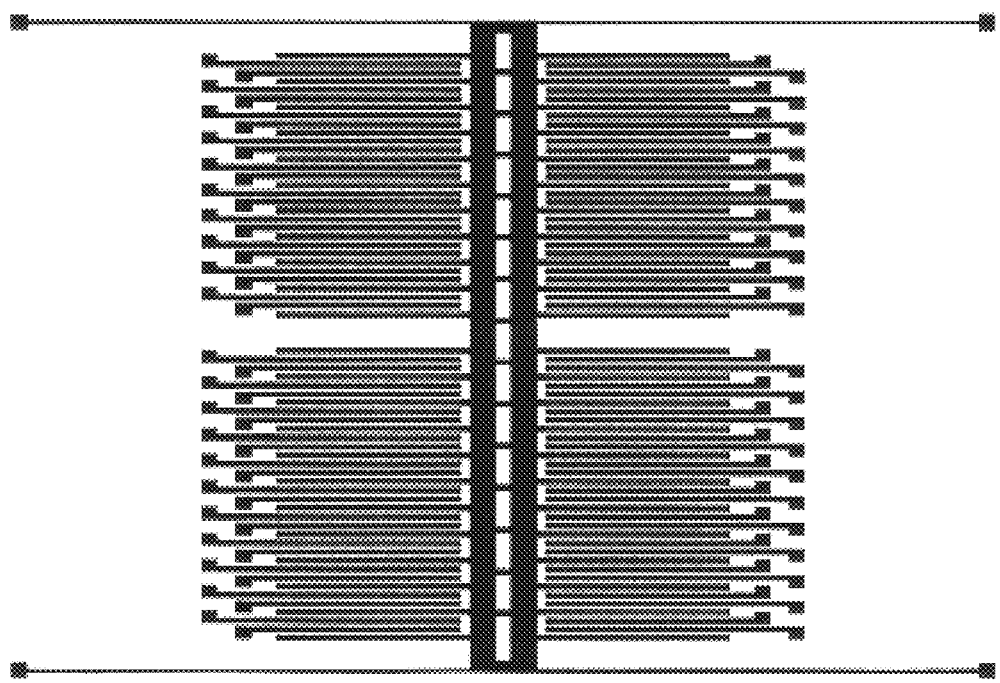
FIG. 20 is a schematic view of a silhouette plots of ADXL50.

In order to adapt to digital three-axis angular increment voltage value and three-axis digital velocity increment voltage values from the step 2, referring to FIG. 15, the above mentioned step 3 further comprises the steps of:

3B.1 inputting digital three-axis angular increment voltage values from the input/output interface circuit 65 of the step 2 and coarse angular rate bias obtained from an angular rate producer and acceleration producer calibration procedure in high data rate (short interval) into a coning correction module 801; computing coning effect errors in the coning correction module 801 using the input digital three-axis angular increment voltage values and coarse angular rate bias; and outputting three-axis coning effect terms and three-axis angular increment voltage values at reduced data rate (long interval), which are called three-axis long-interval angular increment voltage values, into a angular rate compensation module 802, 3B.2 inputting the coning effect errors and three-axis long-interval angular increment voltage values from the coning correction module 801 and angular rate device misalignment parameters, fine angular rate bias, angular rate device scale factor, and coning correction scale factor from the angular rate producer and acceleration producer calibration procedure to the angular rate compensation module 802; compensating definite errors in the input three-axis long-interval angular increment voltage values using the input coning effect errors, angular rate device misalignment parameters fine angular rate bias, and coning correction scale factor; transforming the compensated three-axis long-interval angular increment voltage values to real three-axis long-interval angular increments using the angular rate device scale factor; and outputting the real three-axis angular increments to an alignment rotation vector computation module 805, 3B.3 inputting the three-axis velocity increment voltage values from the input/output interface circuit 65 of the step 2 and acceleration device misalignment, acceleration device bias, and acceleration device scale factor from the angular rate producer and acceleration producer calibration procedure to accelerometer compensation module 803; transforming the input three-axis velocity increments voltage values into real three-axis velocity increments using the acceleration device scale factor; compensating the definite errors in three-axis velocity increments using the input acceleration device misalignment, accelerometer bias; outputting the compensated three-axis velocity increments to the level acceleration computation module 804, 3B.4 updating a quaternion, which is a vector representing rotation motion of the carrier, using the compensated three-axis angular increments from the angular rate compensation module 802, an east damping rate increment from an east damping computation module 808, a north damping rate increment from a north damping computation module 809, and vertical damping rate increment from a vertical damping computation module 810; and the updated quaternion is output to a direction cosine matrix computation module 806, 3B.5 computing the direction cosine matrix, using the input updated quaternion; and the computed direction cosine matrix is output to a level acceleration computation module 804 and an attitude and heading angle extract module 807, 3B.6 extracting attitude and heading angle using the direction cosine matrix from the direction cosine matrix computation module 806; outputting the heading angle into a vertical damping rate computation module 808, 3B.7 computing level velocity increments using the input compensated three-axis velocity increments from the acceleration compensation module 804 and the direction cosine matrix from the direction cosine matrix computation module 806; outputting the level velocity increments to an east damping rate computation module 810 and north damping rate computation module 809, 3B.8 computing east damping rate increments using the north velocity increment of the input level velocity increments from the level acceleration computation module 804; feeding back the east damping rate increments to the alignment rotation vector computation module 805, 3B.9 computing north damping rate increments using the east velocity increment of the input level velocity increments from the level acceleration computation module 804; feeding back the north damping rate increments to the alignment rotation vector computation module 805, and 3B.10 computing vertical damping rate increments using the computed heading angle from the attitude and heading angle extract module 807 and a measured heading angle from an external sensor 90; and feeding back the vertical damping rate increments to the alignment rotation vector computation module 805.

In order to adapt to real digital three-axis angular increment values and real three-axis digital velocity increment values from step 2, referring to FIG. 15, the above mentioned step 3B.1~3B.3 are modified into:

3B.1A inputting real digital three-axis angular increment values from the step 2 and coarse angular rate bias obtained from an angular rate producer and acceleration producer calibration procedure in high data rate (short interval) into a coning correction module 801; computing coning effect errors in the coning correction module 801 using the input digital three-axis angular increment values and coarse angular rate bias; and outputting three-axis coning effect terms and three-axis angular increment values at reduced data rate (long interval), which are called three-axis long-interval angular increment values, into a angular rate compensation module 802, 3B.2A inputting the coning effect errors and three-axis long-interval angular increment values from the coning correction module 801 and angular rate device misalignment parameters and fine angular rate bias from the angular rate producer and acceleration producer calibration procedure to the angular rate compensation module 802; compensating definite errors in the input three-axis long-interval angular increment values using the input coning effect errors, angular rate device misalignment parameters, fine angular rate bias, and coning correction scale factor; and outputting the real three-axis angular increments to an alignment rotation vector computation module 805, and 3B.3A inputting the three-axis velocity increment values from Step 2 and acceleration device misalignment, and acceleration device bias from the angular rate producer and acceleration producer calibration procedure to accelerometer compensation module 803; compensating the definite errors in three-axis velocity increments using the input acceleration device misalignment, accelerometer bias; outputting the compensated three-axis velocity increments to the level acceleration computation module 804.

Figure 14:
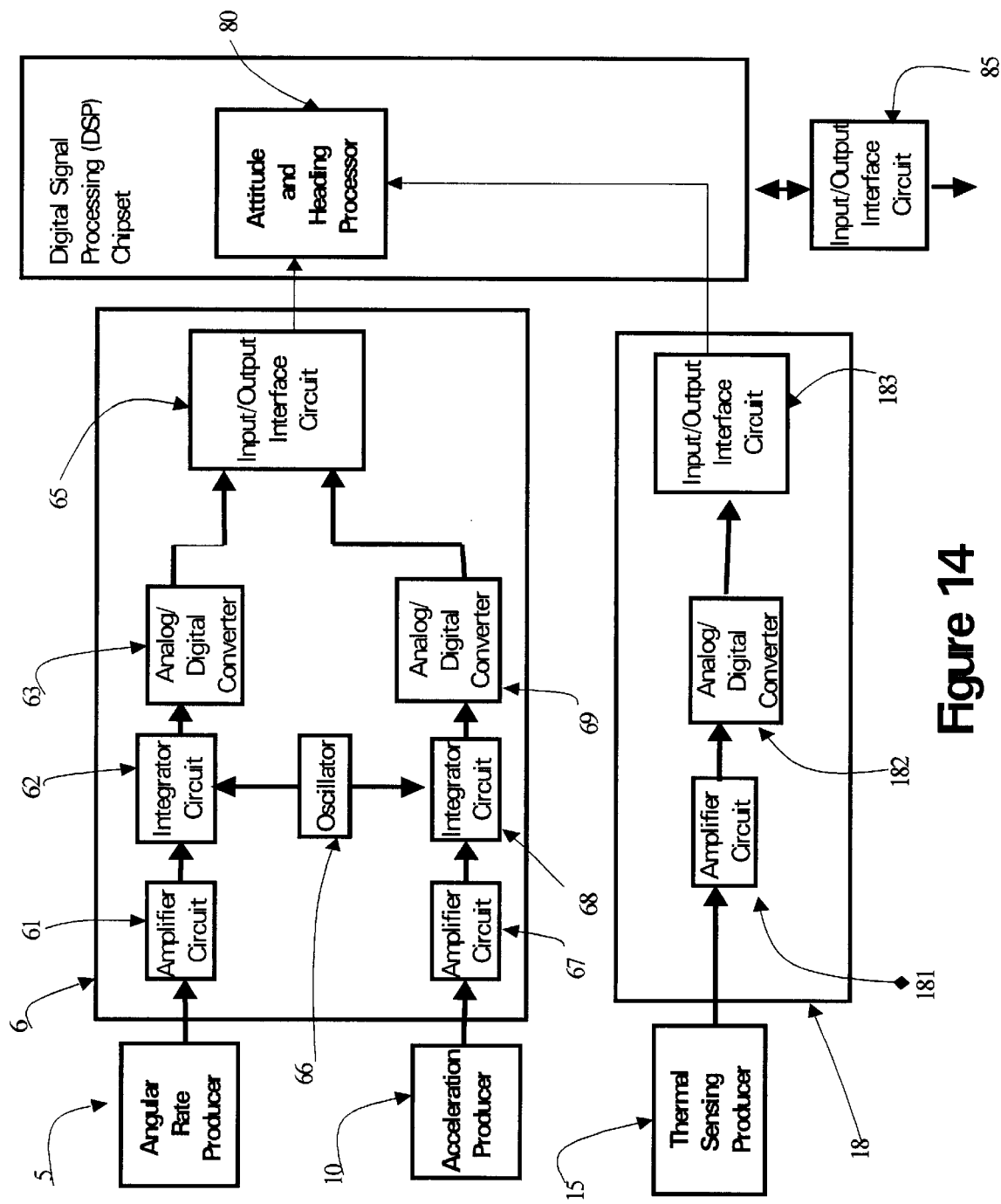
FIG. 14 is a block diagram illustrating a processing module with thermal compensation processing for carrier motion measurements according to the above preferred embodiment of the present invention.

Referring to FIGS. 3, 14, and 15, which use temperature compensation method, in order to adapt to digital three-axis angular increment voltage value and three-axis digital velocity increment voltage values from step 2, the above mentioned step 3A-2 further comprises the steps of:

3A-2.1 inputting digital three-axis angular increment voltage values from the input/output interface circuit 65 of the step 2 and coarse angular rate bias obtained from an angular rate producer and acceleration producer calibration procedure in high data rate (short interval) into a coning correction module 801; computing coning effect errors in the coning correction module 801 using the input digital three-axis angular increment voltage values and coarse angular rate bias; and outputting three-axis coning effect terms and three-axis angular increment voltage values in reduced data rate (long interval), which are called three-axis long-interval angular increment voltage values, into a angular rate compensation module 802, 3A-2.2 inputting the coning effect errors and three-axis long-interval angular increment voltage values from the coning correction module 801 and angular rate device misalignment parameters, fine angular rate bias, angular rate device scale factor, and coning correction scale factor from the angular rate producer and acceleration producer calibration procedure to the angular rate compensation module 802; inputting the digital temperature signals from input/output interface circuit 183 of the step 3A.1.2 and temperature sensor scale factor; computing current temperature of angular rate producer; accessing angular rate producer temperature characteristic parameters using the current temperature of angular rate producer; compensating definite errors in the input three-axis long-interval angular increment voltage values using the input coning effect errors, angular rate device misalignment parameters, fine angular rate bias, and coning correction scale factor; transforming the compensated three-axis long-interval angular increment voltage values to real three-axis long-interval angular increments; compensating temperature-induced errors in the real three-axis long-interval angular increments using the angular rate producer temperature characteristic parameters; and outputting the real three-axis angular increments to an alignment rotation vector computation module 805, 3A-2.3 inputting the three-axis velocity increment voltage values from the input/output interface circuit 65 of the step 2 and acceleration device misalignment, acceleration bias, acceleration device scale factor from the angular rate producer and acceleration producer calibration procedure to acceleration compensation module 803; inputting the digital temperature signals from input/output interface circuit 183 of the step 3A-1 and temperature sensor scale factor; computing current temperature of acceleration producer; accessing acceleration producer temperature characteristic parameters using the current temperature of acceleration producer; transforming the input three-axis velocity increments voltage values into real three-axis velocity increments using the acceleration device scale factor; compensating the definite errors in three-axis velocity increments using the input acceleration device misalignment, acceleration bias; compensating temperature-induced errors in the real three-axis velocity increments using the acceleration producer temperature characteristic parameters; and outputting the compensated three-axis velocity increments to the level acceleration computation module 804, 3A-2.4 updating a quaternion, which is a vector representing rotation motion of the carrier, using the compensated three-axis angular increments from the angular rate compensation module 802, an east damping rate increment from an east damping computation module 808, a north damping rate increment from a north damping computation module 809, and vertical damping rate increment from a vertical damping computation module 810, and the updated quaternion is output to a direction cosine matrix computation module 806, 3A-2.5 computing the direction cosine matrix, using the input updated quaternion; and the computed direction cosine matrix is output to a level acceleration computation module 804 and an attitude and heading angle extract module 807, 3A-2.6 extracting attitude and heading angle using the direction cosine matrix from the direction cosine matrix computation module 806; outputting the heading angle into a vertical damping rate computation module 808, 3A-2.7 computing level velocity increments using the input compensated three-axis velocity increments from the acceleration compensation module 804 and the direction cosine matrix from the direction cosine matrix computation module 806; outputting the level velocity increments to an east damping rate computation module 810 and north damping rate computation module 809, 3A-2.8 computing east damping rate increments using the north velocity increment of the input level velocity increments from the level acceleration computation module 804; feeding back the east damping rate increments to the alignment rotation vector computation module 805, 3A-2.9 computing north damping rate increments using the east velocity increment of the input level velocity increments from the level acceleration computation module 804; feeding back the north damping rate increments to the alignment rotation vector computation module 805, and 3A-2.10 computing vertical damping rate increments using the computed heading angle from the attitude and heading angel extract module 807 and a measured heading angle from an external sensor 90; and feeding back the vertical damping rate increments to the alignment rotation vector computation module 805.

Referring to FIGS. 3, 14, and 15, which use temperature compensation method, in order to adapt to real digital three-axis angular increment values and real three-axis digital velocity increment values from the step 2, the above mentioned step 3A-2.1 are modified into:

3A-2.1A inputting digital three-axis angular increment values from the input/output interface circuit 65 of Step 2 and coarse angular rate bias obtained from an angular rate producer and acceleration producer calibration procedure in high data rate (short interval) into a coning correction module 801; computing coning effect errors in the coning correction module 801 using the input digital three-axis angular increment values and coarse angular rate bias; and outputting three-axis coning effect terms and three-axis angular increment values in reduced data rate (long interval), which are called three-axis long-interval angular increment values, into a angular rate compensation module 802, 3A-2.2A inputting the coning effect errors and three-axis long-interval angular increment values from the coning correction module 801 and angular rate device misalignment parameters and fine angular rate bias from the angular rate producer and acceleration producer calibration procedure to the angular rate compensation module 802; inputting the digital temperature signals from input/output interface circuit 183 of the step 3A-1.2 and temperature sensor scale factor; computing current temperature of angular rate producer; accessing angular rate producer temperature characteristic parameters using the current temperature of angular rate producer; compensating definite errors in the input three-axis long-interval angular increment values using the input coning effect errors, angular rate device misalignment parameters, fine angular rate bias, and coning correction scale factor; compensating temperature-induced errors in the real three-axis long-interval angular increments using the angular rate producer temperature characteristic parameters; and outputting the real three-axis angular increments to an alignment rotation vector computation module 805, and 3A-2.3A inputting the three-axis velocity increment values from the input/output interface circuit 65 of the step 2 and acceleration device misalignment and acceleration bias from the angular rate producer and acceleration producer calibration procedure to acceleration compensation module 803; inputting the digital temperature signals from input/output interface circuit 183 of the step 3A-1 and temperature sensor scale factor;

computing current temperature of acceleration producer; accessing acceleration producer temperature characteristic parameters using the current temperature of acceleration producer; compensating the definite errors in three-axis velocity increments using the input acceleration device misalignment, acceleration bias; compensating temperature-induced errors in the real three-axis velocity increments using the acceleration producer temperature characteristic parameters; and outputting the compensated three-axis velocity increments to the level acceleration computation module 804.

In order to meet the diverse requirements of application systems, referring to FIGS. 11 and 14, an additional processing step, which is performed after the above embodied step 2.3.1~2.3.3, comprises:

Packing the digital three-axis angular increment voltage values, the digital three-axis velocity increment, and digital temperature signals in the input/output interface circuit 65 and the input/output interface circuit 305 with a specific format required by a external user system to use them, such as RS-232 serial communication standard, RS-422 serial communication standard, popular PCI/ISA bus standard, and 1553 bus standard, etc.

In order to meet diverse requirements of application systems, an additional processing step, referring to FIGS. 1, 11 and 14, which is performed after the above embodied step 3, comprises:

Packing the digital three-axis angular increment values, the digital three-axis velocity increment, and obtained attitude and heading data in the input/output interface circuit 85 with a specific format required by a external user system to use them, such as RS-232 serial communication standard, RS-422 serial communication standard, PCI/ISA bus standard, and 1553 bus standard, etc.

What is claimed is:

1. A processing method for motion measurement, comprising the steps of:
   (a) producing three-axis angular rate signals by an angular rate producer and three-axis acceleration signals by an acceleration producer;
   (b) converting said three-axis angular rate signals into digital angular increments and converting said input three-axis acceleration signals into digital velocity increments in an angular increment and velocity increment producer;
   (c) computing attitude and heading angle measurements using said three-axis digital angular increments and said three-axis velocity increments in an attitude and heading processor; and
   (d) maintaining a predetermined operating temperature throughout said above steps, wherein said predetermined operating temperature is a constant designated temperature selected between 150° F. and 185° F.;
   wherein the step (b) further comprises the steps of:
      (b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
      (b.2) forming an angular reset voltage pulse and a velocity reset voltage pulse as an angular scale and a velocity scale respectively;
      (b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
      (b.4) scaling said voltage values of said three-axis accumulated angular and velocity increments into real three-axis angular and velocity increment voltage values;
   wherein the step (d) further comprises the steps of:
      (db-1) producing temperature voltage signals by a thermal sensing producer to an analog/digital converter;
      (db-2) sampling said temperature voltage signals in said analog/digital converter and digitizing said sampled temperature voltage signals to digital signals which are output to said temperature controller;
      (db-3) computing digital temperature commands in a temperature controller using said input digital signals from said analog/digital converter, a temperature sensor scale factor, and a pre-determined operating temperature of said angular rate producer and acceleration producer, wherein said digital temperature commands are fed back to a digital/analog converter, and
      (db-4) converting said digital temperature commands input from said temperature controller in said digital/analog converter into analog signals which are output to a heater device to provide adequate heat for maintaining said predetermined operating temperature throughout said processing method.

2. A processing method for motion measurement, as recited in claim 1, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

3. A processing method for motion measurement, as recited in claim 2, wherein in the step (db-4), said input analog signals from said digital/analog converter for driving said heater device is amplified in a second amplifier circuit before outputting to said heater device.

4. A processing method for motion measurement, comprising the steps of:
   (a) producing three-axis angular rate signals by an angular rate producer and three-axis acceleration signals by an acceleration producer;
   (b) converting said three-axis angular rate signals into digital angular increments and converting said input three-axis acceleration signals into digital velocity increments in an angular increment and velocity increment producer;
   (c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled voltage signals, and said digital signals are output to an input/output interface circuit;

(db-3) computing digital temperature commands in a temperature controller using said input digital temperature voltage signals from said input/output interface circuit, a temperature sensor scale factor, and said predetermined operating temperature of said angular rate producer and acceleration producer, wherein said digital temperature commands are fed back to said input/output interface circuit; and (db-4) converting said digital temperature commands input from said input/output interface circuit in said digital/analog converter into analog signals which are output to a heater device to provide adequate heat for maintaining said predetermined operating temperature throughout said processing method.

5. A processing method for motion measurement, as recited in claim 4, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

6. A processing method for motion measurement, as recited in claim 5, wherein in the step (db-4), said input analog signals from said digital/analog converter for driving said heater device is amplified in a second amplifier circuit before outputting to said heater device.

7. A processing method for motion measurement, comprising the steps of:

(a) producing three-axis angular rate signals by an angular rate producer and three-axis acceleration signals by an acceleration producer;

(b) converting said three-axis angular rate signals into digital angular Increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled temperature voltage signals to digital signals which are output to said temperature controller;

(db-3) computing digital temperature commands in a temperature controller using said input digital signals from said analog/digital converter, a temperature sensor scale factor, and a pre-determined operating temperature of said angular rate producer and acceleration producer, wherein said digital temperature commands are fed back to a digital/analog converter, and (db-4) converting said digital temperature commands input from said temperature controller in said digital/analog converter into analog signals which are output to a heater device to provide adequate heat for maintaining said predetermined operating temperature throughout said processing method.

8. A processing method for motion measurement, as recited in claim 7, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

9. A processing method for motion measurement. as recited in claim 8, wherein in the step (db-4), said input analog signals from said digital/analog converter for driving said heater device is amplified in a second amplifier circuit before outputting to said heater device.

10. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled voltage signals, and said digital signals are output to an input/output interface circuit;

(db-3) computing digital temperature commands in a temperature controller using said input digital temperature voltage signals from said input/output interface circuit, a temperature sensor scale factor, and said predetermined operating temperature of said angular rate producer and acceleration producer, wherein said digital temperature commands are fed back to said input/output interface circuit; and (db-4) converting said digital temperature commands input from said input/output interface circuit in said digital/analog converter into analog signals which are output to a heater device to provide adequate heat for maintaining said predetermined operating temperature throughout said processing method.

11. A processing method for motion measurement, as recited in claim 10, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

12. A processing method for motion measurement, as recited in claim 11, wherein in the step (db-4), said input analog signals from said digital/analog converter for driving said heater device is amplified in a second amplifier circuit before outputting to said heater device.

13. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
(b.4) scaling said voltage values of said three-axis accumulated angular and velocity increments into real three-axis angular and velocity increment voltage values;

wherein the step (d) further comprises the steps of:
(db-1) producing temperature voltage signals by a thermal sensing producer to an analog/digital converter;
(db-2) sampling said temperature voltage signals in said analog/digital converter and digitizing said sampled temperature voltage signals to digital signals which are output to said temperature controller;
(db-3) computing digital temperature commands in a temperature controller using said input digital signals from said analog/digital converter, a temperature sensor scale factor, and a pre-determined operating temperature of said angular rate producer and acceleration producer, wherein said digital temperature commands are fed back to a digital/analog converter, and
(db-4) converting said digital temperature commands input from said temperature controller in said digital/analog converter into analog signals which are output to a heater device to provide adequate heat for maintaining said predetermined operating temperature throughout said processing method.

14. A processing method for motion measurement, as recited in claim 13, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

15. A processing method for motion measurement, as recited in claim 14, wherein in the step (db-4), said input analog signals from said digital/analog converter for driving said heater device is amplified in a second amplifier circuit before outputting to said heater device.

16. A processing method for motion measurement, comprising the steps of:
(a) producing three-axis angular rate signals by an angular rate producer and three-axis acceleration signals by an acceleration producer;
(b) converting said three-axis angular rate signals into digital angular increments and converting said input three-axis acceleration signals into digital velocity increments in an angular increment and velocity increment producer;
(c) computing attitude and heading angle measurements using said three-axis digital angular increments and said three-axis velocity increments in an attitude and heading processor; and
(d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled voltage signals, and said digital signals are output to an input/output interface circuit;

(db-3) computing digital temperature commands in a temperature controller using said input digital temperature voltage signals from said input/output interface circuit, a temperature sensor scale factor, and said predetermined operating temperature of said angular rate producer and acceleration producer, wherein said digital temperature commands are fed back to said input/output interface circuit; and (db-4) converting said digital temperature commands input from said input/output interface circuit in said digital/analog converter into analog signals which are output to a heater device to provide adequate heat for maintaining said predetermined operating temperature throughout said processing method.

17. A processing method for motion measurement, as recited in claim 16, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

18. A processing method for motion measurement, as recited in claim 17, wherein in the step (db-4), said input analog signals from said digital/analog converter for driving said heater device is amplified in a second amplifier circuit before outputting to said heater device.

19. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled temperature voltage signals to digital signals which are output to said temperature controller;

(db-3) computing digital temperature commands in a temperature controller using said input digital signals from said analog/digital converter, a temperature sensor scale factor, and a pre-determined operating temperature of said angular rate producer and acceleration producer, wherein said digital temperature commands are fed back to a digital/analog converter, and (db-4) converting said digital temperature commands input from said temperature controller in said digital/analog converter into analog signals which are output to a heater device to provide adequate heat for maintaining said predetermined operating temperature throughout said processing method.

20. A processing method for motion measurement, as recited in claim 19, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

21. A processing method for motion measurement, as recited in claim 20, wherein in the step (db-4), said input analog signals from said digital/analog converter for driving said heater device is amplified in a second amplifier circuit before outputting to said heater device.

22. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled voltage signals, and said digital signals are output to an input/output interface circuit;

(db-3) computing digital temperature commands in a temperature controller using said input digital temperature voltage signals from said input/output interface circuit, a temperature sensor scale factor, and said predetermined operating temperature of said angular rate producer and acceleration producer, wherein said digital temperature commands are fed back to said input/output interface circuit; and (db-4) converting said digital temperature commands input from said input/output interface circuit in said digital/analog converter into analog signals which are output to a heater device to provide adequate heat for maintaining said predetermined operating temperature throughout said processing method.

23. A processing method for motion measurement, as recited in claim 22, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

24. A processing method for motion measurement, as recited in claim 22, wherein in the step (db-4), said input analog signals from said digital/analog converter for driving said heater device is amplified in a second amplifier circuit before outputting to said heater device.

25. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:
(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and
(a.4) outputting said amplified three-axis analog angular rate signals and said amplified three-axis analog acceleration signals to a first integrator circuit and a second integrator circuit respectively;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
(b.4) scaling said voltage values of said three-axis accumulated angular and velocity increments into real three-axis angular and velocity increment voltage values;

wherein the step (d) further comprises the steps of:
(db-1) producing temperature voltage signals by a thermal sensing producer to an analog/digital converter;
(db-2) sampling said temperature voltage signals in said analog/digital converter and digitizing said sampled temperature voltage signals to digital signals which are output to said temperature controller;
(db-3) computing digital temperature commands in a temperature controller using said input digital signals from said analog/digital converter, a temperature sensor scale factor, and a pre-determined operating temperature of said angular rate producer and acceleration producer, wherein said digital temperature commands are fed back to a digital/analog converter, and
(db-4) converting said digital temperature commands input from said temperature controller in said digital/analog converter into analog signals which are output to a heater device to provide adequate heat for maintaining said predetermined operating temperature throughout said processing method.

26. A processing method for motion measurement, as recited in claim 25, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

27. A processing method for motion measurement, as recited in claim 26, wherein in the step (db-4), said input analog signals from said digital/analog converter for driving said heater device is amplified in a second amplifier circuit before outputting to said heater device.

28. A processing method for motion measurement, comprising the steps of:
(a) producing three-axis angular rate signals by an angular rate producer and three-axis acceleration signals by an acceleration producer;
(b) converting said three-axis angular rate signals into digital angular increments and converting said input three-axis acceleration signals into digital velocity increments in an angular increment and velocity increment producer;
(c) computing attitude and heading angle measurements using said three-axis digital angular increments and said three-axis velocity increments in an attitude and heading processor; and
(d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:

(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and (a.4) outputting said amplified three-axis analog angular rate signals and said amplified three-axis analog acceleration signals to a first integrator circuit and a second integrator circuit respectively;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (d) further comprises the steps of:

(db-1) producing temperature voltage signals by a thermal sensing producer to an analog/digital converter;

(db-2) sampling said temperature voltage signals in said analog/digital converter and digitizing said sampled voltage signals, and said digital signals are output to an input/output interface circuit;

(db-3) computing digital temperature commands in a temperature controller using said input digital temperature voltage signals from said input/output interface circuit, a temperature sensor scale factor, and said predetermined operating temperature of said angular rate producer and acceleration producer, wherein said digital temperature commands are fed back to said input/output interface circuit; and (db-4) converting said digital temperature commands input from said input/output interface circuit in said digital/analog converter into analog signals which are output to a heater device to provide adequate heat for maintaining said predetermined operating temperature throughout said processing method.

29. A processing method for motion measurement, as recited in claim 28, wherein in the step (db-1), said voltage signals acquired from said thermal sensing producer is amplified by a first amplifier circuit before outputting to said analog/digital converter, for amplifying said voltage signals and suppressing said noise residing in said voltage signals and improving said signal-to-noise ratio.

30. A processing method for motion measurement, as recited in claim 29, wherein in the step (db-4), said input analog signals from said digital/analog converter for driving said heater device is amplified in a second amplifier circuit before outputting to said heater device.

31. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps;

wherein the step (c) further comprises the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals; as an angular scale and a velocity scale respectively;

(b.2) forming an angular reset voltage pulse and a velocity reset voltage pulse (b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

32. A processing method for motion measurement, as recited in claim, 31, wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and (ca-1.2) sampling said input amplified voltage signals in said analog/digital converters and digitizing said sampled voltage signals to form digital signals outputting to said attitude and heading processor.

33. A processing method for motion measurement, as recited in claim 32, wherein the step (ca-1.2) further comprises the step of:

(ca-1.2a) sampling said input amplified voltage signals in said analog/digital converters and digitizing said sampled voltage signals to form digital signals outputting to said input/output interface circuit.

34. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps;

wherein the step (c) further the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein said angular rate produce and said acceleration producer are MEMS angular rate device army and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:
    (b.3.1) inputting said accumulated angular increments and said accumulated velocity increments into an angular analog/digital converter and a velocity analog/digital converter respectively;
    (b.3.2) digitizing said accumulated angular increments by said angular analog/digital converter by measuring said accumulated angular increments with said angular reset voltage pulse to form a digital angular measurements of voltage in terms of said angular increment counts which is output to an input/output interlace circuit;
    (b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and
    (b.3.4) outputting said digital three-axis angular and velocity increment voltage values by said input/output interface circuit.

35. A processing method for motion measurement, as recited in claim 34, wherein the step (ca-1) is implemented by an analog/digital converter for said thermal sensing producer with analog voltage output and further comprises the steps of:
    (ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and
    (ca-1.2) sampling said input amplified voltage signals in said analog/digital converters and digitizing said sampled voltage signals to form digital signals outputting to said attitude and heading processor.

36. A processing method for motion measurement, as recited in claim 35, wherein the step (ca-1.2) further comprises the step of:
    (ca-1.2a) sampling said input amplified voltage signals in said analog/digital converters and digitizing said sampled voltage signals to form digital signals outputting to said input/output interface circuit.

37. A processing method for motion measurement, comprising the steps of:
    (a) producing three-axis angular rate signals by an angular rate producer and three-axis acceleration signals by an acceleration producer;
    (b) converting said three-axis angular rate signals into digital angular increments and converting said input three-axis acceleration signals into digital velocity increments in an angular increment and velocity increment producer;
    (c) computing attitude and heading angle measurements using said three-axis digital angular increments and said three-axis velocity increments in an attitude and heading processor; and
    (d) maintaining a predetermined operating temperature throughout said above steps;
wherein the step (c) further comprises the steps of:
    (ca-1) producing temperature signals by a thermal sensing producer and outputting a digital temperature value to an attitude and heading processor by means of a temperature digitizer;
    (ca-2) accessing temperature characteristic parameters of said angular rate producer and said acceleration producer using a current temperature of said angular rate producer and said acceleration producer from said temperature digitizer; and
    (ca-3) compensating said errors induced by thermal effects in said input digital angular and velocity increments and computing attitude and heading angle measurements using said three-axis digital angular increments and three-axis velocity increments in said attitude and heading processor;
wherein said angular rate producer and said acceleration producer are MEMS angular rate device array and acceleration device array and said outputting signals of said angular rate producer and said acceleration producer are analog voltage signals;
wherein the step (a) further comprises the steps of:
    (a.1) acquiring three-axis analog angular rate voltage signals from said angular producer, which are directly proportional to carrier angular rates, and
    (a.2) acquiring three-axis analog acceleration voltage signals from said acceleration producer, which are directly proportional to carrier acceleration;
wherein the step (b) further comprises the steps of:
    (b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
    (b.2) forming an angular reset voltage pulse and a velocity reset voltage pulse as an angular scale and a velocity scale respectively;
    (b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
    (b.4) scaling said voltage values of said three-axis accumulated angular and velocity increments into real three-axis angular and velocity increment voltage values;
wherein the step (b.3) further comprises said steps of:
    (b.3.1) inputting said accumulated angular increments and said accumulated velocity increments into an angular analog/digital converter and a velocity analog/digital converter respectively;
    (b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit;

(b.3.4) outputting said digital three-axis angular and velocity increment voltage values by said input/output interface circuit.

38. A processing method for motion measurement, as recited in claim 37, wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and (ca-1.2) sampling said input amplified voltage signals in said analog/digital converters and digitizing said sampled voltage signals to form digital signals outputting to said attitude and heading processor.

39. A processing method for motion measurement, as recited in claim 38, wherein the step (ca-1.2) further comprises the step of:

(ca-1.2a) sampling said input amplified voltage signals in said analog/digital converters and digitizing said sampled voltage signals to form digital signals outputting to said input/output interface circuit.

40. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer axis (c) computing attitude and heading angle measurements using said three-digital angular increments and said three-axis velocity increments in an attitude and heading processor; and (d) maintaining a predetermined operating temperature throughout said above steps;

wherein the step (c) further comprises the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein said amplifying step comprises the steps of:

(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and (a.4) outputting said amplified three-axis analog angular rate signals and said amplified three-axis analog acceleration signals to a first integrator circuit and a second integrator circuit respectively;

wherein the step (b) further comprises the steps of:

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

41. A processing method for motion measurement, as recited in claim 40, wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and (ca-1.2) sampling said input amplified voltage signals in said analog/digital converters and digitizing said sampled voltage signals to form digital signals outputting to said attitude and heading processor.

42. A processing method for motion measurement, as recited in claim 41, wherein the step (ca-1.2) further comprises the step of:

(ca-1.2a) sampling said input amplified voltage signals in said analog/digital converters and digitizing said sampled voltage signals to form digital signals outputting to said input/output interface circuit.

43. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps;

wherein the step (c) further comprises the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and (ca-1.2) sampling said input amplified voltage signals in said analog/digital converters and digitizing said sampled voltage signals to form digital signals outputting to said attitude and heading processor.

44. A processing method for motion measurement, as recited in claim 43, wherein the step (ca-1.2) further comprises the step of:

(ca-1.2a) sampling said input amplified voltage signals in said analog/digital converters and digitizing said sampled voltage signals to form digital signals outputting to said input/output interface circuit.

45. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps;

wherein the step (c) further comprises the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and (ca-1.2) sampling said input amplified voltage signals in said analog/digital converters and digitizing said sampled voltage signals to form digital signals outputting to said attitude and heading processor.

46. A processing method for motion measurement, as recited in claim 45, wherein the step (ca-1.2) further comprises the step of:

(ca-1.2a) sampling said input amplified voltage signals in said analog/digital converters and digitizing said sampled voltage signals to form digital signals outputting to said input/output interface circuit.

47. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps;

wherein the step (c) further comprises the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier acceleration;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively, and (b.4) scaling said voltage values of said three-axis accumulated angular and velocity increments into real three-axis angular and velocity increment voltage values;

wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital. converter, and (ca-1.2) sampling said input amplified voltage signals in said analog/digital converters and digitizing said sampled voltage signals to form digital signals outputting to said attitude and heading processor.

48. A processing method for motion measurement, as recited in claim 47, wherein the step (ca-1.2) further comprises the step of:

(ca-1.2a) sampling said input amplified voltage signals in said analog/digital converters and digitizing said sampled voltage signals to form digital signals outputting to said input/output interface circuit.

49. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps;

wherein the step (c) further comprises the steps of:

(ca-1) producing temperature signals by a thermal sensing producer and outputting a digital temperature value to an attitude and heading processor by means of a temperature digitizer;

(ca-2) accessing temperature characteristic parameters of said angular rate producer and said acceleration producer using a current temperature of said angular rate producer and said acceleration producer from said temperature digitizer; and (ca-3) compensating said errors induced by thermal effects in said input digital angular and velocity increments and computing attitude and heading angle measurements using said three-axis digital angular increments and three-axis velocity increments in said attitude and heading processor;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein said amplifying step comprises the steps of:

(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and (a.4) outputting said amplified three-axis analog angular rate signals and said amplified three-axis analog acceleration signals to a first integrator circuit and a second integrator circuit respectively;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (ca-1) is implemented by an analog/digital converter for said thermal sensing producer with analog voltage output and further comprises the steps of:

(ca-1.1) acquiring voltage signals from said thermal sensing producer to said amplifier circuit for amplifying said signals and suppressing said noise residing in said voltage signals and improving said voltage signal-to-noise ratio, wherein said amplified voltage signals are output to said analog/digital converter, and (ca-1.2) sampling said input amplified voltage signals in said analog/digital converters and digitizing said sampled voltage signals to form digital signals outputting to said attitude and heading processor.

50. A processing method for motion measurement, as recited in claim 49, wherein the step (ca-1.2) further comprises the step of:

(ca-1.2a) sampling said input amplified voltage signals in said analog/digital converters and digitizing said sampled voltage signals to form digital signals outputting to said input/output interface circuit.

51. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.1) said three-axis analog angular voltage signals and said three-axis analog acceleration voltage signals are each reset to accumulate from a zero value at an initial point of every predetermined time interval.

52. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.2), said angular reset voltage pulse and said velocity reset voltage pulse are implemented by producing a timing pulse by an oscillator.

53. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.3), said measurement of said voltage values of said three-axis accumulated angular and velocity increments are implemented by an analog/digital converter, for digitizing said raw three-axis angular and velocity increment voltage values into digital three-axis angular and velocity increments.

54. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F., wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

55. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.1) said three-axis analog angular voltage signals and said three-axis analog acceleration voltage signals are each reset to accumulate from a zero value at an initial point of every predetermined time interval.

56. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.2), said angular reset voltage pulse and said velocity reset voltage pulse are implemented by producing a timing pulse by an oscillator.

57. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.3), said measurement of said voltage values of said three-axis accumulated angular and velocity increments are implemented by an analog/digital converter, for digitizing said raw three-axis angular and velocity increment voltage values into digital three-axis angular and velocity increments.

58. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

59. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.1) said three-axis analog angular voltage signals and said three-axis analog acceleration voltage signals are each reset to accumulate from a zero value at an initial point of every predetermined time interval.

60. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals:

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.2), said angular reset voltage pulse and said velocity reset voltage pulse are implemented by producing a timing pulse by an oscillator.

61. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.3), said measurement of said voltage values of said three-axis accumulated angular and velocity increments are implemented by an analog/digital converter, for digitizing said raw three-axis angular and velocity increment voltage values into digital three-axis angular and velocity increments.

62. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

63. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
(b.4) scaling said voltage values of said three-axis accumulated angular and velocity increments into real three-axis angular and velocity increment voltage values;

wherein in the step (b.1) said three-axis analog angular voltage signals and said three-axis analog acceleration voltage signals are each reset to accumulate from a zero value at an initial point of every predetermined time interval.

64. A processing method for motion measurement, comprising the steps of:
(a) producing three-axis angular rate signals by an angular rate producer and three-axis acceleration signals by an acceleration producer;
(b) converting said three-axis angular rate signals into digital angular increments and converting said input three-axis acceleration signals into digital velocity increments in an angular increment and velocity increment producer;
(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
(b.4) scaling said voltage values of said three-axis accumulated angular and velocity increments into real three-axis angular and velocity increment voltage values;

wherein in the step (b.2), said angular reset voltage pulse and said velocity reset voltage pulse are implemented by producing a timing pulse by an oscillator.

65. A processing method for motion measurement, comprising the steps of:
(a) producing three-axis angular rate signals by an angular rate producer and three-axis acceleration signals by an acceleration producer;
(b) converting said three-axis angular rate signals into digital angular increments and converting said input three-axis acceleration signals into digital velocity increments in an angular increment and velocity increment producer;
(c) computing attitude and heading angle measurements using said three-axis digital angular increments and said three-axis velocity increments in an attitude and heading processor; and
(d) maintaining a predetermined operating temperature throughout said above steps, wherein said predetermined operating temperature is a constant designated temperature selected between 150° F. and 185° F.;
wherein said angular rate producer and said acceleration producer are MEMS angular rate device array and acceleration device array and said outputting signals of said angular rate producer and said acceleration producer are analog voltage signals;
wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;
wherein said step (a) further comprises amplifying steps of amplifying said analog voltage signals input from said angular rate producer and said acceleration producer and suppressing noise signals residing within said analog voltage signals input from said angular rate producer and said acceleration producer;
wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
(b.4) scaling said voltage values of said three-axis accumulated angular and velocity increments into real three-axis angular and velocity increment voltage values;
wherein in the step (b.3), said measurement of said voltage values of said three-axis accumulated angular and velocity increments are implemented by an analog/digital converter, for digitizing said raw three-axis angular and velocity increment voltage values into digital three-axis angular and velocity increments.

66. A processing method for motion measurement, comprising the steps of:
(a) producing three-axis angular rate signals by an angular rate producer and three-axis acceleration signals by an acceleration producer;
(b) converting said three-axis angular rate signals into digital angular increments and converting said input three-axis acceleration signals into digital velocity increments in an angular increment and velocity increment producer;
(c) computing attitude and heading angle measurements using said three-axis digital angular increments and said three-axis velocity increments in an attitude and heading processor; and
(d) maintaining a predetermined operating temperature throughout said above steps, wherein said predetermined operating temperature is a constant designated temperature selected between 150° F. and 185° F.;
wherein said angular rate producer and said acceleration producer are MEMS angular rate device array and acceleration device array and said outputting signals of said angular rate producer and said acceleration producer are analog voltage signals;
wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;
wherein said step (a) further comprises amplifying steps of amplifying said analog voltage signals input from said angular rate producer and said acceleration producer and suppressing noise signals residing within said analog voltage signals input from said angular rate producer and said acceleration producer;
wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

67. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:

(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and (a.4) outputting said amplified three-axis analog angular rate signals and said amplified three-axis analog acceleration signals to a first integrator circuit and a second integrator circuit respectively;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.1) said three-axis analog angular voltage signals and said three-axis analog acceleration voltage signals are each reset to accumulate from a zero value at an initial point of every predetermined time interval.

68. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:
(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and
(a.4) outputting said amplified three-axis analog angular rate signals and said amplified three-axis analog acceleration signals to a first integrator circuit and a second integrator circuit respectively;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;
(b.2) forming an angular reset voltage pulse and a velocity reset voltage pulse as an angular scale and a velocity scale respectively;
(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and
(b.4) scaling said voltage values of said three-axis accumulated angular and velocity increments into real three-axis angular and velocity increment voltage values;

wherein in the step (b.2), said angular reset voltage pulse and said velocity reset voltage pulse are implemented by producing a timing pulse by an oscillator.

69. A processing method for motion measurement, comprising the steps of:
(a) producing three-axis angular rate signals by an angular rate producer and three-axis acceleration signals by an acceleration producer;
(b) converting said three-axis angular rate signals into digital angular increments and converting said input three-axis acceleration signals into digital velocity increments in an angular increment and velocity increment producer;
(c) computing attitude and heading angle measurements using said three-axis digital angular increments and said three-axis velocity increments in an attitude and heading processor; and
(d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:
(a.1) acquiring three-axis analog angular rate voltage signals from said angular producer, which are directly proportional to carrier angular rates, and
(a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:
(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and
(a.4) outputting said amplified three-axis analog angular rate signals and said amplified three-axis analog acceleration signals to a first integrator circuit and a second integrator circuit respectively;

wherein the step (b) further comprises the steps of:
(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-tonoise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein in the step (b.3), said measurement of said voltage values of said three-axis accumulated angular and velocity increments are implemented by an analog/digital converter, for digitizing said raw three-axis angular and velocity increment voltage values into digital three-axis angular and velocity increments.

70. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer, which are directly proportional to carrier angular rates, and (a.2) acquiring three-axis analog acceleration voltage signals from said acceleration producer, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:

(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and (a.4) outputting said amplified three-axis analog angular rate signals and said amplified three-axis analog acceleration signals to a first integrator circuit and a second integrator circuit respectively;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

71. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the thermal controlling loop step (d) further comprises the steps of:

(da-1) producing temperature signals by a thermal sensing producer;

(da-2) inputting said temperature signals to a thermal processor for computing temperature control commands using said temperature signals, a temperature scale factor, and a predetermined operating temperature of said angular rate producer and said acceleration producer 10;

(da-3) producing driving signals to a heater device using said temperature control commands; and (da-4) outputting said driving signals to said heater device for controlling said heater device to provide a dequate heat for maintaining said p redetermined operating temperature throughout said processing method;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

72. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the thermal controlling loop step (d) further comprises the steps of:

(da-1) producing temperature signals by a thermal sensing producer;

(da-2) inputting said temperature signals to a thermal processor for computing temperature control commands using said temperature signals, a temperature scale factor, and a predetermined operating temperature of said angular rate producer and said acceleration producer 10;

(da-3) producing driving signals to a heater device using said temperature control commands; and (da-4) outputting said driving signals to said heater device for controlling said heater device to provide adequate heat for maintaining said predetermined operating temperature throughout said processing method;

wherein said angular rate producer and said acceleration producer are MEMS angular rate device array and acceleration device array and said outputting signals of said angular rate producer and said acceleration producer are analog voltage signals;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

73. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the thermal controlling loop step (d) further comprises the steps of:

(da-1) producing temperature signals by a thermal sensing producer;

(da-2) inputting said temperature signals to a thermal processor for computing temperature control commands using said temperature signals, a temperature scale factor, and a predetermined operating temperature of said angular rate producer and said acceleration producer 10;

(da-3) producing driving signals to a heater device using said temperature control commands; and (da-4) outputting said driving signals to said heater device for controlling said heater device to provide a dequate heat for maintaining said predetermined operating temperature throughout said processing method;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer 5, which are directly proportional to carrier angular rates, and (a.2) acquiring three-axis analog acceleration voltage signals from said acceleration producer 10, which are directly proportional to carrier accelerations;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

74. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said input three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout said above steps, wherein said predetermined operating temperature is a constant designated temperature selected between 150° F. and 185° F.;

wherein the thermal controlling loop step (d) further comprises the steps of:

(da-1) producing temperature signals by a thermal sensing producer;

(da-2) inputting said temperature signals to a thermal processor for computing temperature control commands using said temperature signals, a temperature scale factor, and a predetermined operating temperature of said angular rate producer and said acceleration producer 10;

(da-3) producing driving signals to a heater device using said temperature commands; and (da-4) outputting said driving signals to said heater device for controlling said heater device to provide adequate heat for maintaining said predetermined operating temperature throughout said processing method;

wherein said angular rate producer and said acceleration producer are MEMS angular rate device array and acceleration device array and said outputting signals of said angular rate producer and said acceleration producer are analog voltage signals;

wherein the step (a) further comprises the steps of:

(a.1) acquiring three-axis analog angular rate voltage signals from said angular producer 5, which are directly proportional to carrier angular rates, and (a.2) acquiring three-axis analog acceleration voltage signals from said acceleration producer 10, which are directly proportional to carrier accelerations;

wherein said step (a) further comprises amplifying steps of amplifying said analog voltage signals input from said angular rate producer and said acceleration producer and suppressing noise signals residing within said analog voltage signals input from said angular rate producer and said acceleration producer;

wherein said amplifying step comprises the steps of:

(a.3) amplifying said three-axis analog angular rate voltage signals and said three-axis analog acceleration voltage signals by means of a first amplifier circuit and a second amplifier circuit respectively to form amplified three-axis analog angular rate signals and amplified three-axis analog acceleration signals respectively; and (a.4) outputting said amplified three-axis analog angular rate signals and said amplified three-axis analog acceleration signals to a first integrator circuit and a second integrator circuit respectively;

wherein the step (b) further comprises the steps of:

(b.1) integrating said three-axis analog angular rate voltage signals and said three-axis analog acceleration voltage signals for a predetermined time interval to accumulate said three-axis analog angular rate voltage signals and said three-axis analog acceleration voltage signals as a raw three-axis angular increment and a raw three-axis velocity increment for said predetermined time interval to achieve accumulated angular increments and accumulated velocity increments, for removing noise signals that are non-directly proportional to said carrier angular rate and acceleration within said three-axis analog angular rate voltage signals and said three-axis analog acceleration voltage signals, improving signal-to-noise ratio, and removing said high frequency signals in said three-axis analog angular rate voltage signals and said three-axis analog acceleration voltage signals;

(b.2) forming an angular reset voltage pulse and a velocity reset voltage pulse as an angular scale and a velocity scale respectively;

(b.3) measuring said voltage values of said three-axis accumulated angular increments and said three-axis accumulated velocity increments with said angular reset voltage pulse and said velocity reset voltage pulse respectively to acquire angular increment counts and velocity increment counts as a digital form of angular and velocity measurements respectively; and (b.4) scaling said voltage values of said three-axis accumulated angular and velocity increments into real three-axis angular and velocity increment voltage values;

wherein the step (b.3) further comprises said steps of:

(b.3.1) inputting said accumulated angular increments and said accumulated velocity increments into an angular analog/digital converter and a velocity analog/digital converter respectively;

(b.3.2) digitizing said accumulated angular increments by said angular analog/digital converter by measuring said accumulated angular increments with said angular reset voltage pulse to form a digital angular measurements of voltage in terms of said angular increment counts which is output to an input/output interface circuit;

(b.3.3) digitizing said accumulated velocity increments by said velocity analog/digital converter by measuring said accumulated velocity increments with said velocity reset voltage pulse to form a digital velocity measurements of voltage in terms of said velocity increment counts which is output to said an input/output interface circuit; and (b.3.4) outputting said digital three-axis angular and velocity increment voltage values by said input/output interface circuit.

* * * * *